United States Patent
Otagiri

(10) Patent No.: US 11,962,728 B2
(45) Date of Patent: Apr. 16, 2024

(54) READING DEVICE AND IMAGE FORMING APPARATUS

(71) Applicant: FUJIFILM Business Innovation Corp., Tokyo (JP)

(72) Inventor: Kei Otagiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/163,057

(22) Filed: Feb. 1, 2023

(65) Prior Publication Data

US 2023/0396719 A1    Dec. 7, 2023

(30) Foreign Application Priority Data

Jun. 7, 2022 (JP) ................. 2022-091978

(51) Int. Cl.
*H04N 1/12* (2006.01)
*H04N 1/00* (2006.01)

(52) U.S. Cl.
CPC ..... *H04N 1/00559* (2013.01); *H04N 1/00496* (2013.01); *H04N 1/00549* (2013.01); *H04N 2201/0081* (2013.01)

(58) Field of Classification Search
CPC ........... H04N 1/00559; H04N 1/00496; H04N 1/00549; H04N 2201/0081
See application file for complete search history.

(56) References Cited

U.S. PATENT DOCUMENTS 5,764,379 A  *  6/1998  Matsuda .............. H04N 1/1013
                                                         358/488
6,603,582 B1 *  8/2003  Cotte .................... H04N 1/1013
                                                         358/496

FOREIGN PATENT DOCUMENTS

JP      2003-157432 A      5/2003
JP      2013-214917 A     10/2013

* cited by examiner

*Primary Examiner* — Moustapha Diaby
(74) *Attorney, Agent, or Firm* — Oliff PLC

(57) ABSTRACT

A reading device includes a body having a base on which a read target object is placed, a reader that reads the read target object placed on the base, a first attachment frame to which the reader is attached such that the reader is disposed above the base, an operation unit that is used for operating the device by touching, a second attachment frame to which the operation unit is attached such that the operation unit is disposed above the base and below the reader, and a body frame to which at least the first attachment frame is attached. The first attachment frame includes multiple frame portions extending upward at positions located away from each other.

17 Claims, 19 Drawing Sheets

FIG. 4
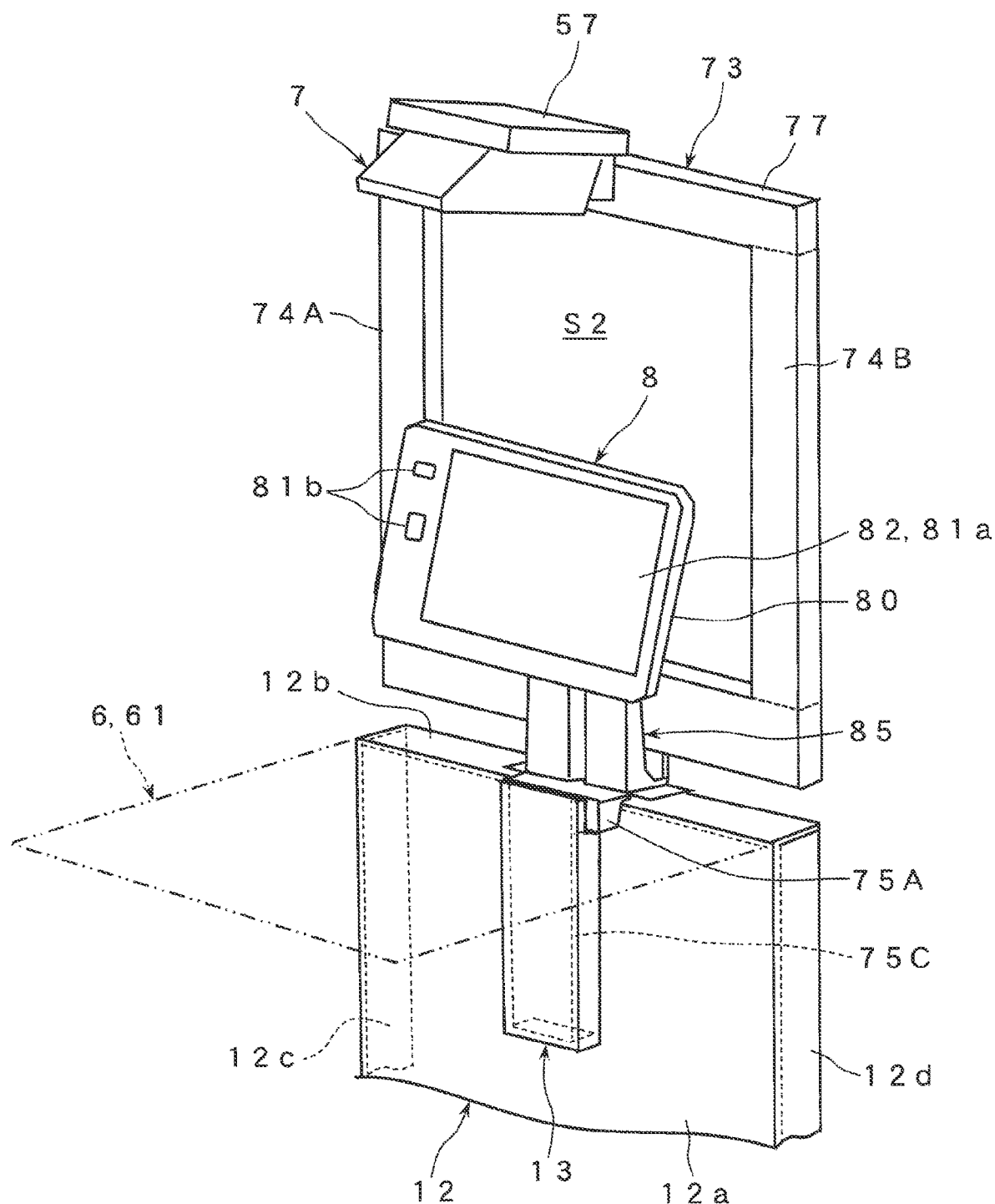
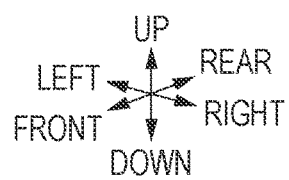

FIG. 8
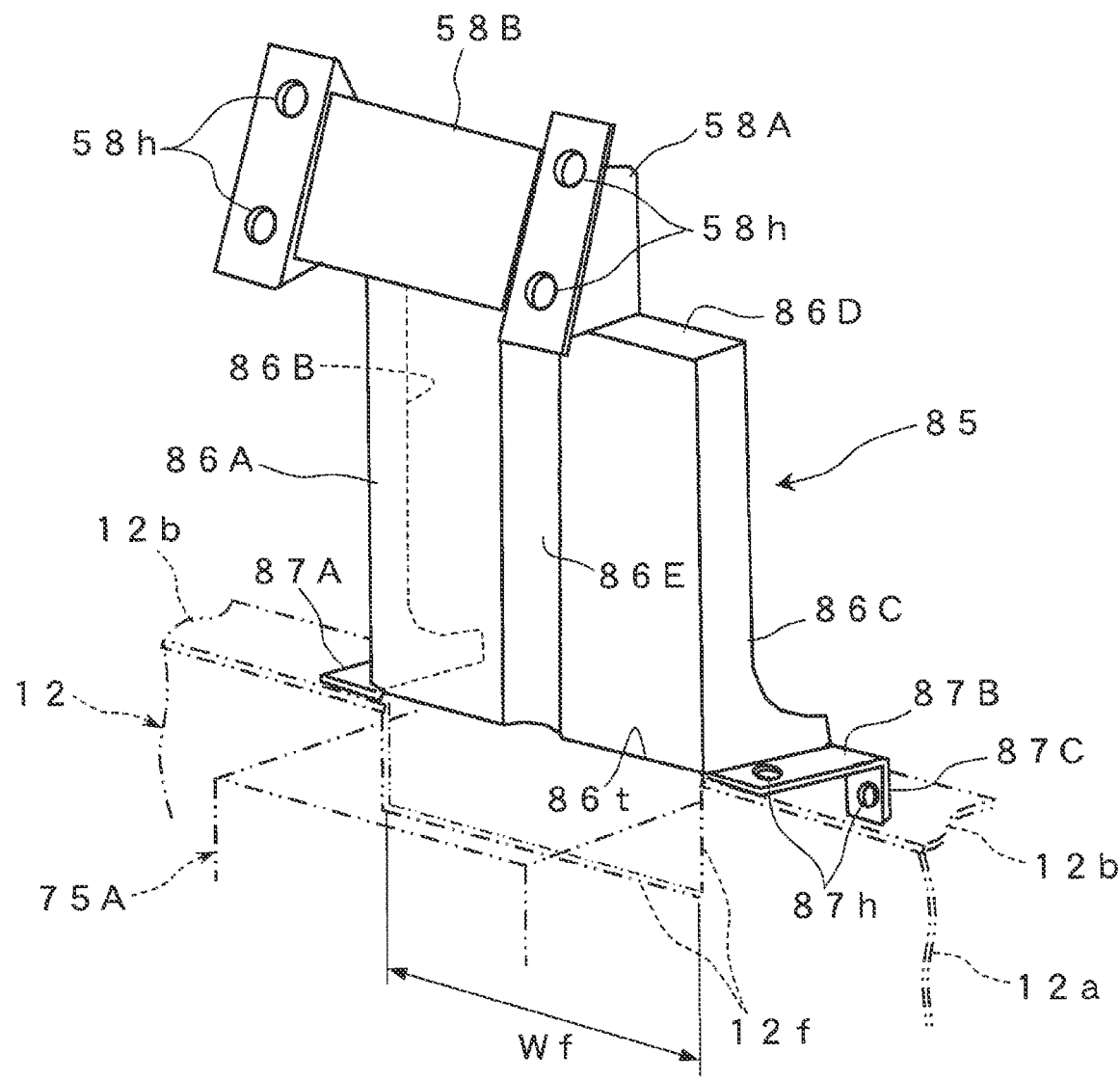
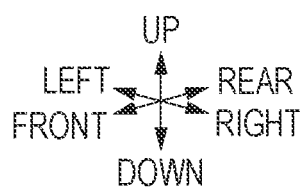

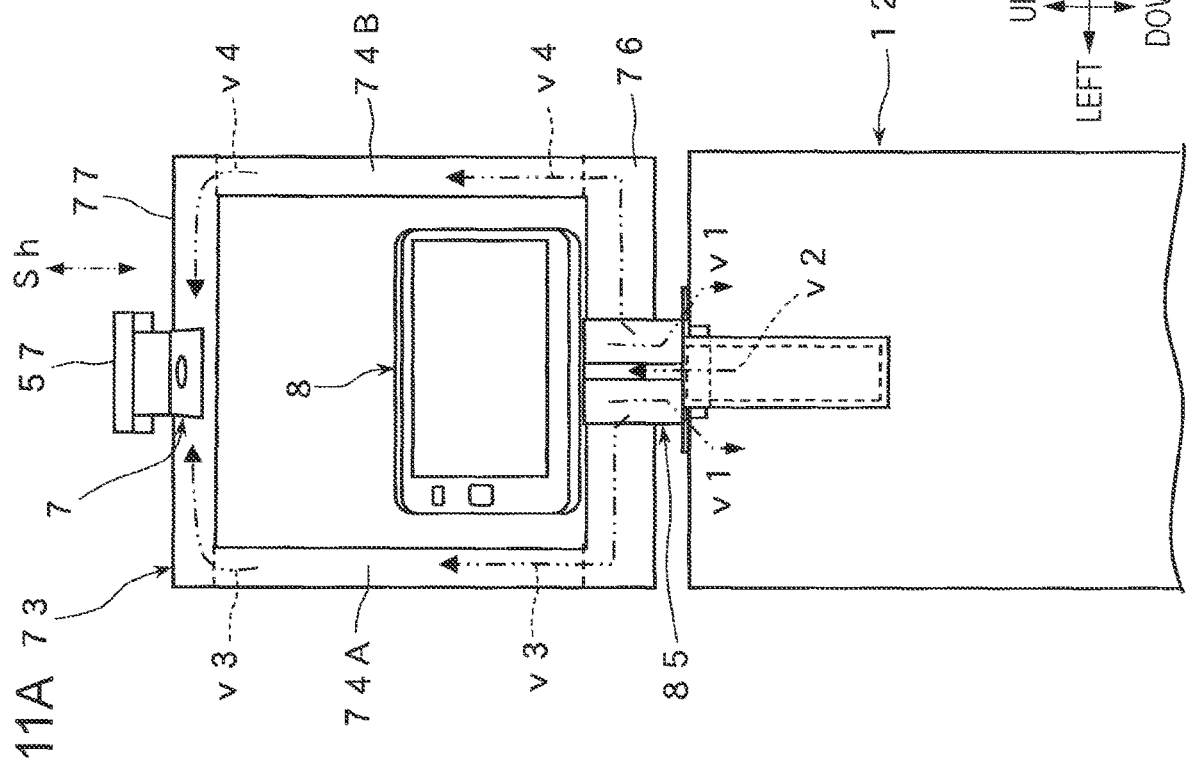

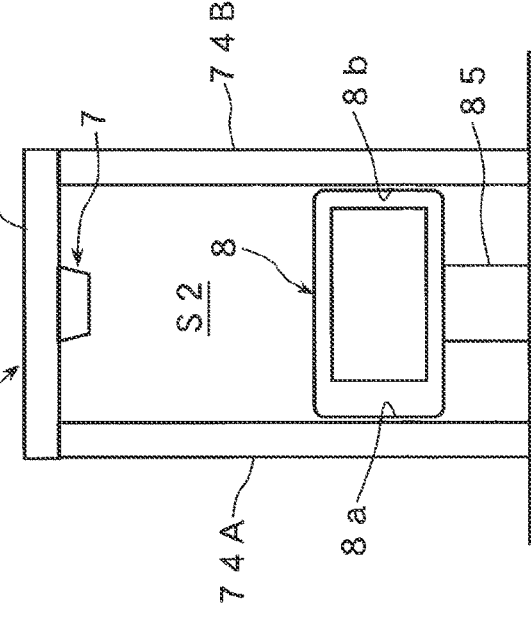
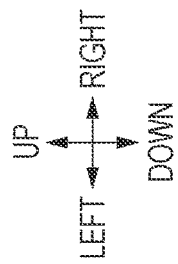
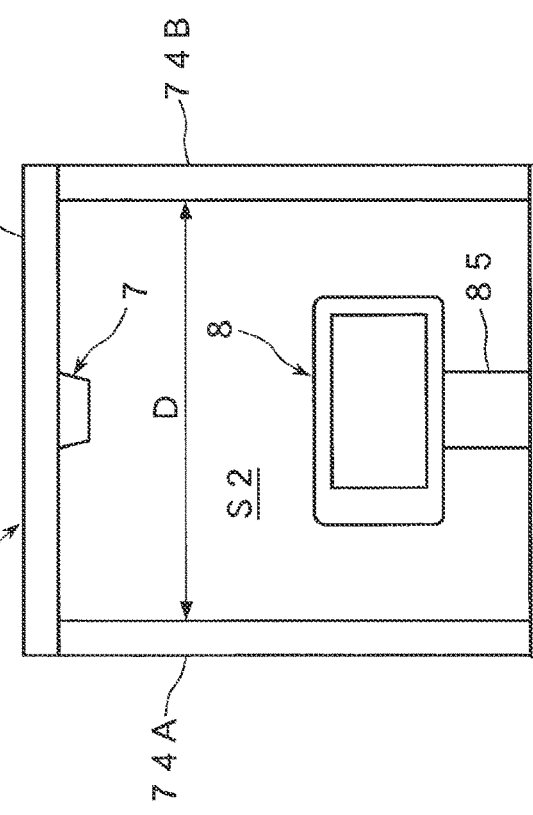
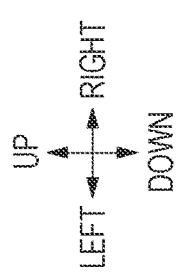

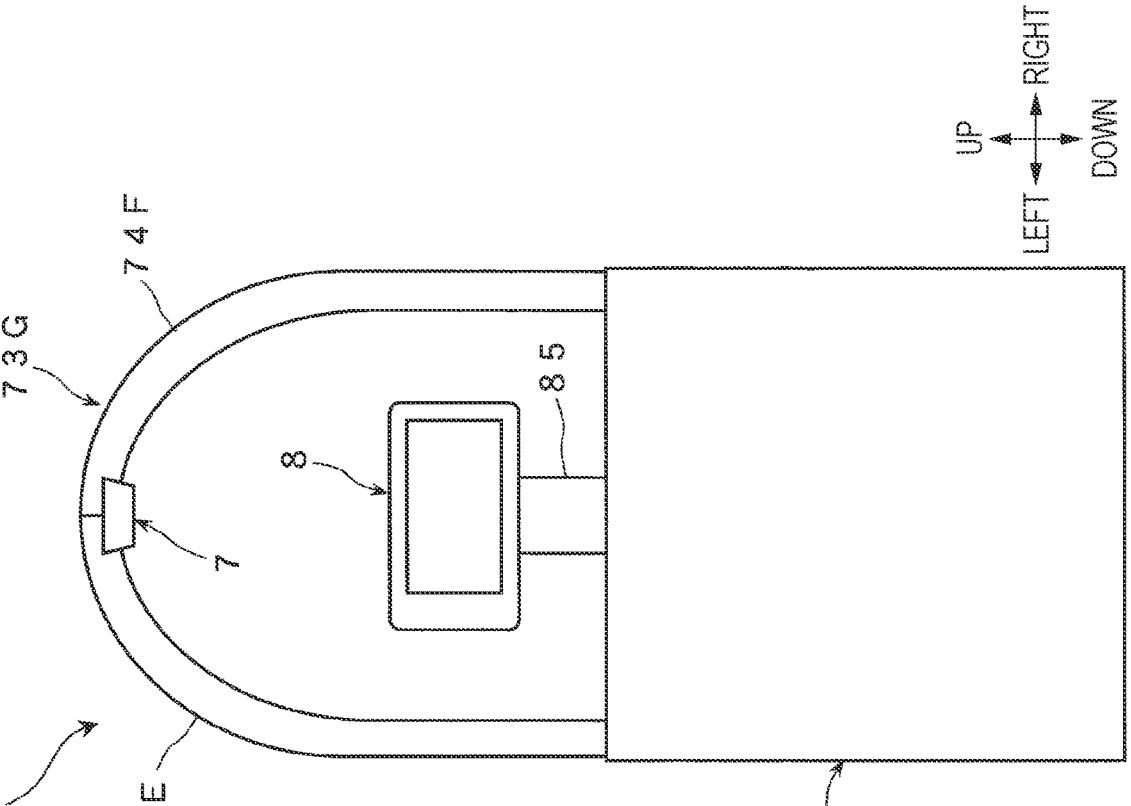
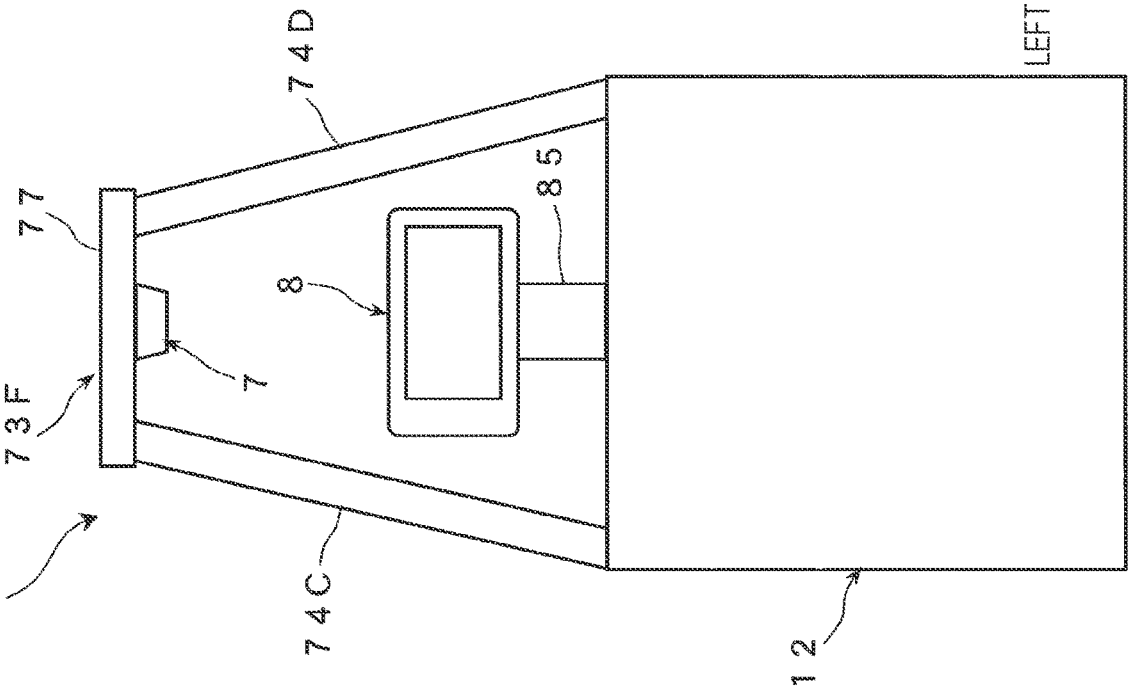

READING DEVICE AND IMAGE FORMING APPARATUS

CROSS-REFERENCE TO RELATED APPLICATIONS

This application is based on and claims priority under 35 USC 119 from Japanese Patent Application No. 2022-091978 filed Jun. 7, 2022.

BACKGROUND

(i) Technical Field

The present disclosure relates to reading devices and image forming apparatuses.

(ii) Related Art

Japanese Unexamined Patent Application Publication No. 2003-157432 (paragraph [0038], FIG. 1) discloses an imaging apparatus including: a document base unit on which a document serving as an imaging target object is placed; an imaging unit, such as a graphic camera, capturing an image of the document placed on the document base unit; a movable holding member that holds the imaging unit and that is attached to the rear end of the upper surface of the document base unit so as to be disposed above document base unit; and an operation panel disposed at the front end of the upper surface of the document base unit.

Japanese Unexamined Patent Application Publication No. 2013-214917 (FIG. 1) discloses a reading device including: a stage on which a read target object is placed; a read head, such as a graphic camera, optically reading the read target object placed on the stage; and an articulated boom that supports the read head above the read target object in a positionally adjustable manner toward and away from the read target object.

SUMMARY

Aspects of non-limiting embodiments of the present disclosure relate to a reading device and an image forming apparatus that may suppress shaking of a reader that reads a read target object from above when the operation unit disposed above a base on which the read target object is placed is touched for operating the device or the apparatus, as compared with a case where the reader is attached to a single upward-extending attachment frame.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device including a body having a base on which a read target object is placed, a reader that reads the read target object placed on the base, a first attachment frame to which the reader is attached such that the reader is disposed above the base, an operation unit that is used for operating the device by touching, a second attachment frame to which the operation unit is attached such that the operation unit is disposed above the base and below the reader, and a body frame to which at least the first attachment frame is attached, wherein the first attachment frame includes a plurality of frame portions extending upward at positions located away from each other.

BRIEF DESCRIPTION OF THE DRAWINGS

Exemplary embodiments of the present disclosure will be described in detail based on the following figures, wherein:

FIG. 4 is a perspective view schematically illustrating an upper part including a reading unit from which an outer cover of the image forming apparatus in FIG. 1 has been removed;

FIG. 8 is a perspective view schematically illustrating a second attachment frame;

FIG. 11A is a front view schematically illustrating a transmission state of a vibration through the reading unit, and FIG. 11B is a side view schematically illustrating the transmission state in FIG. 11A;

FIG. 14A is a front view schematically illustrating the first attachment frame according to a first modification, and FIG. 14B is a front view schematically illustrating the first attachment frame according to a second modification;

FIG. 17A is a front view schematically illustrating the first attachment frame according to a fifth modification, and FIG. 17B is a front view schematically illustrating the first attachment frame according to a sixth modification;

DETAILED DESCRIPTION

Exemplary embodiments of the present disclosure will be described below.

First Exemplary Embodiment

Figure 1:
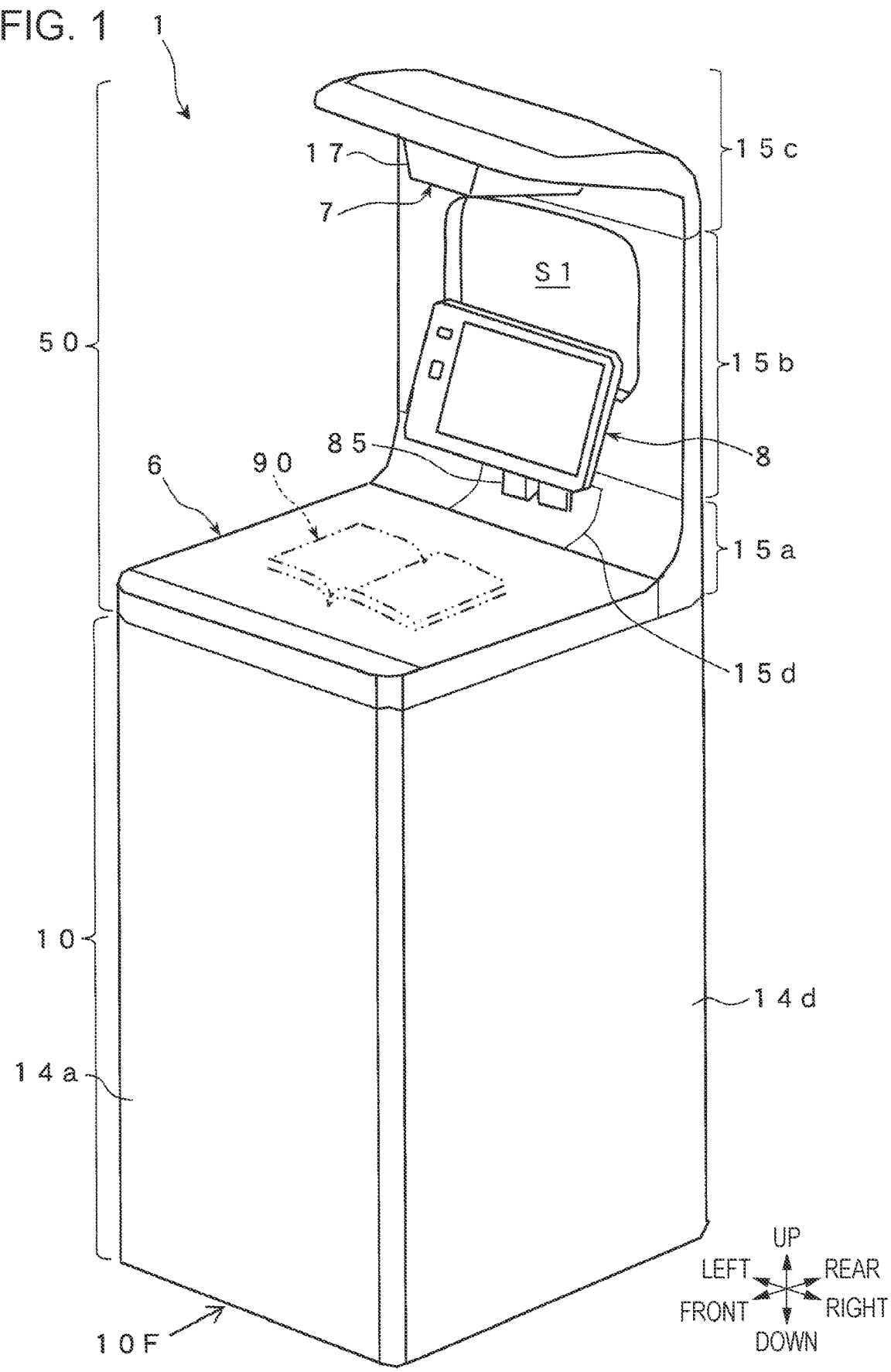
FIG. 1 is a perspective view schematically illustrating an image forming apparatus according to a first exemplary embodiment.
Figure 2:
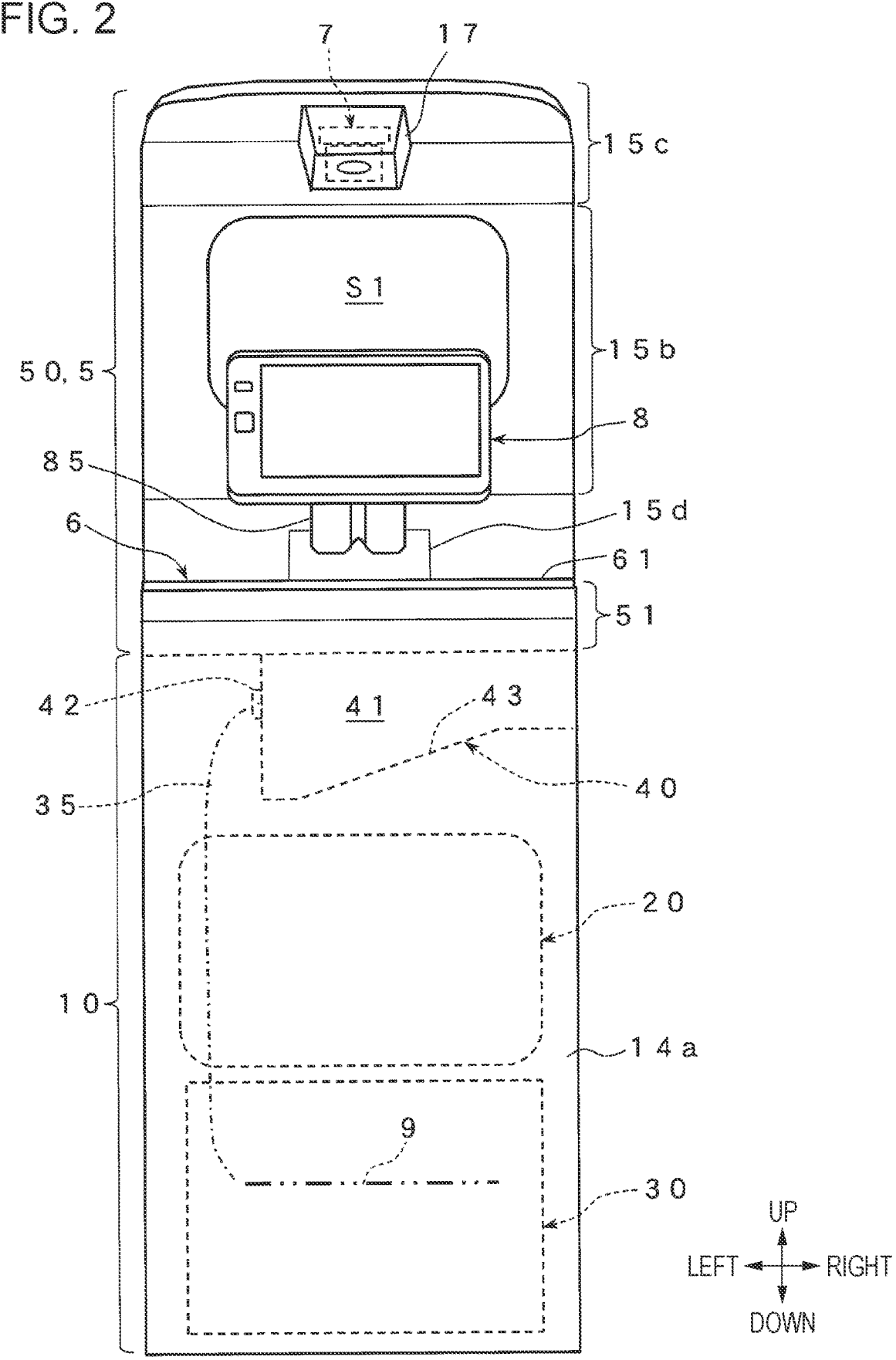
FIG. 2 is a front view schematically illustrating the image forming apparatus in FIG. 1.
Figure 3:
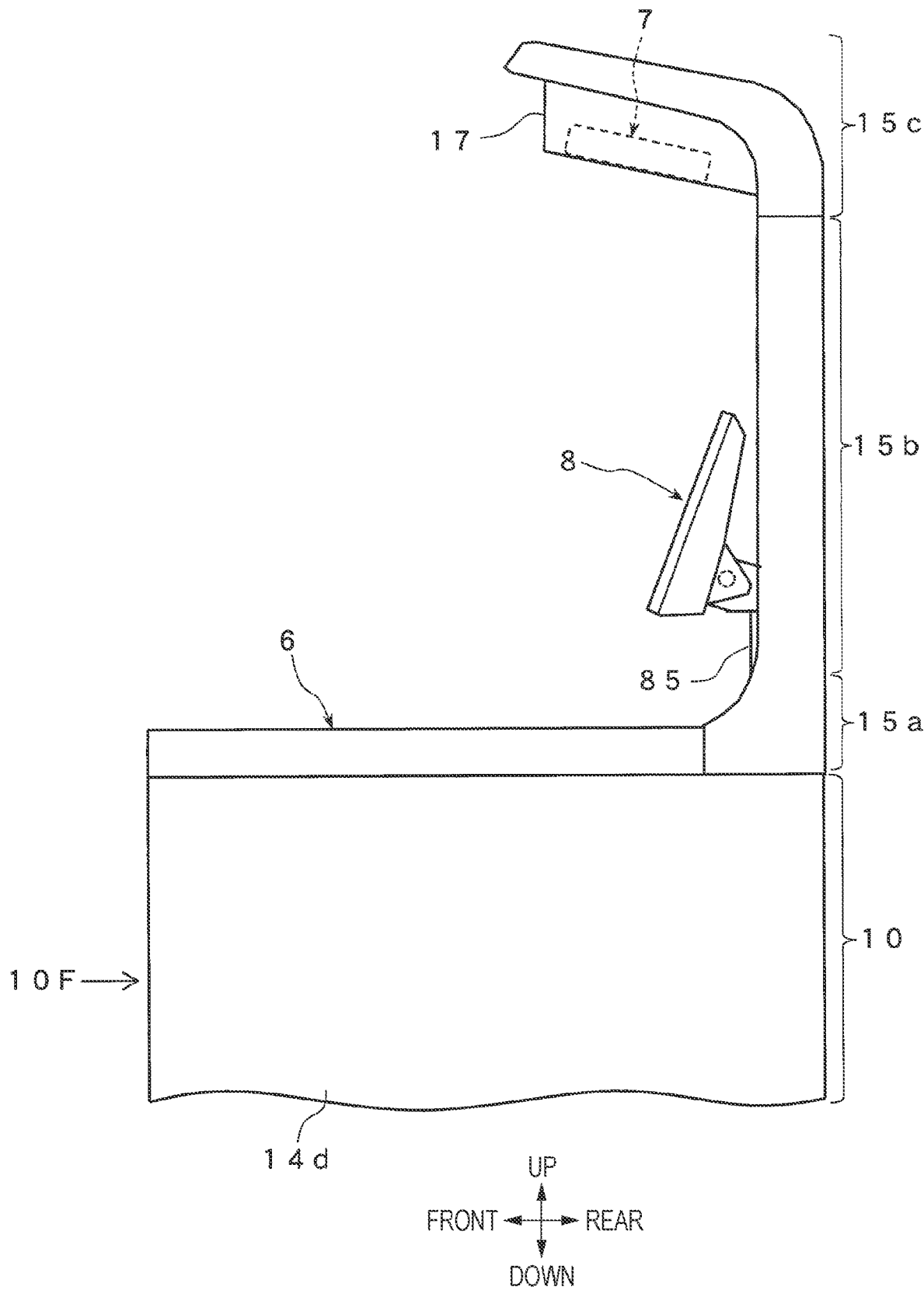
FIG. 3 is a side view schematically illustrating an upper part of the image forming apparatus in FIG. 1.

FIG. 1 is an external perspective view schematically illustrating an image forming apparatus 1 according to a first exemplary embodiment of the present disclosure. FIG. 2 is a front view schematically illustrating the image forming apparatus 1. FIG. 3 is a side view schematically illustrating an upper part of the image forming apparatus 1.

In each of the drawings including FIG. 1, up-down, left-right, and front-rear directions denoted by arrows are directions indicated with reference to a front surface 10F of the image forming apparatus 1 assuming that a user faces the image forming apparatus 1 when using the image forming apparatus 1.

Image Forming Apparatus

As illustrated in FIG. 1 or 2, the image forming apparatus 1 includes a housing 10, an image forming unit 20 disposed inside the housing 10, a medium feed unit 30 and a medium output unit 40, and a reading unit 50 disposed outside and inside the housing 10.

The housing 10 is a structural body having an internal framework section and an external outer section.

The framework section is a structural section formed of, for example, multiple frames and having a predetermined structure and shape. The outer section is a structural section formed of, for example, outer covers and having a predetermined structure and shape.

As illustrated in FIG. 1, with regard to the housing 10 according to the first exemplary embodiment, an external part (body) thereof excluding a part of the reading unit 50 disposed outside the housing 10 is a structural body having a rectangular parallelepiped shape that is long in the up-down direction.

Figure 5:
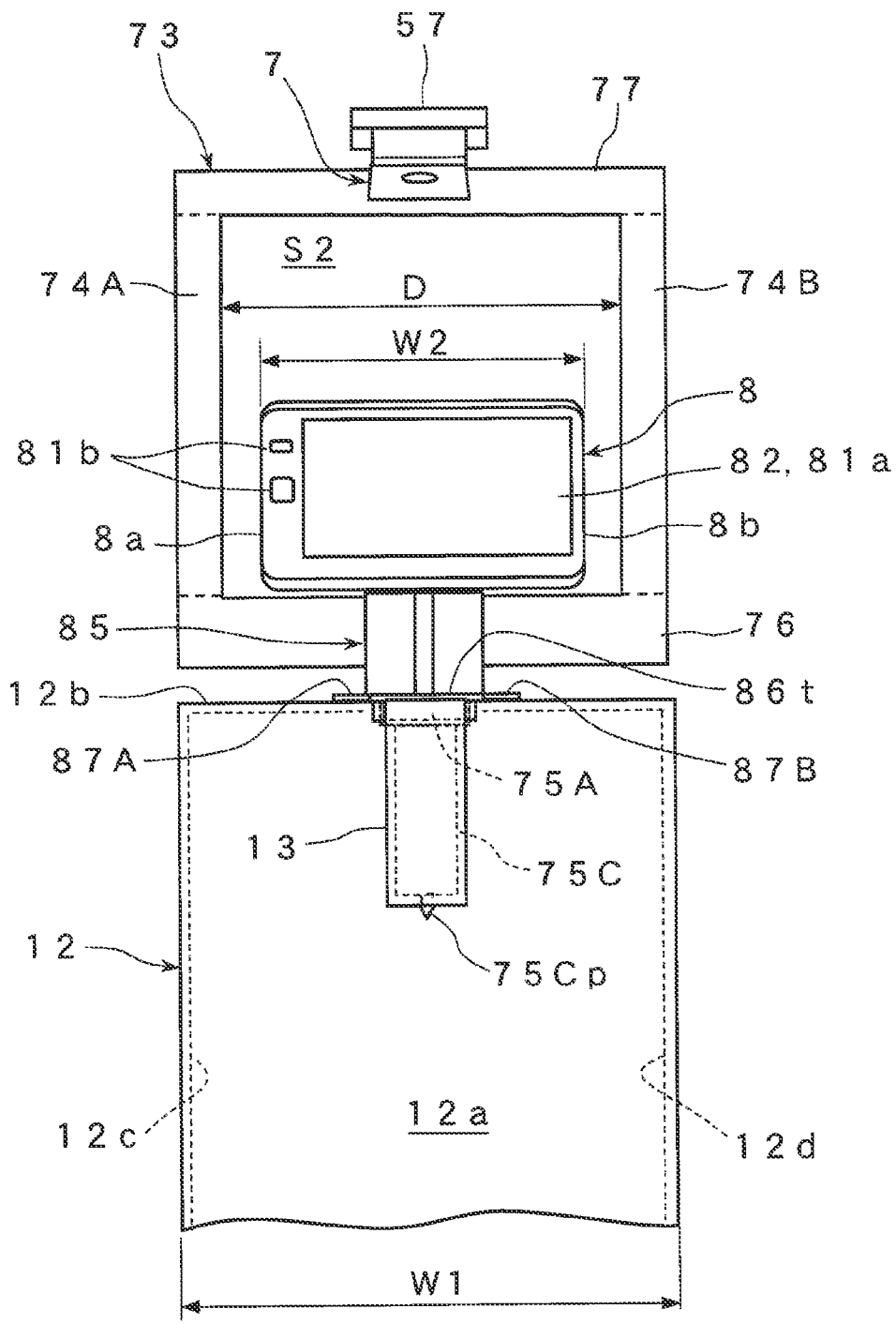
FIG. 5 is a side view schematically illustrating the upper part including the reading unit of the image forming apparatus in FIG. 1.
Figure 6:
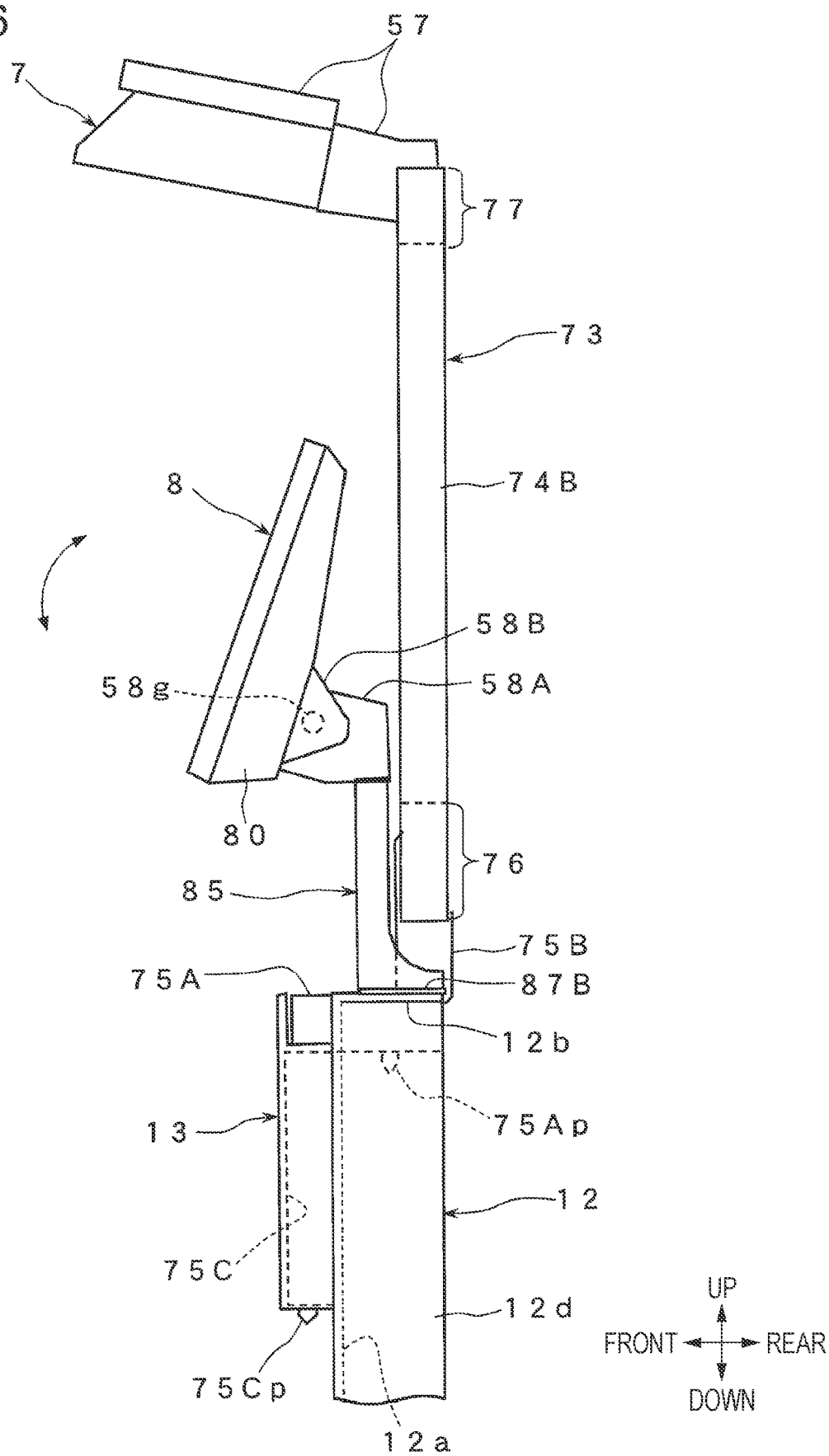
FIG. 6 is a perspective view of a framework section in a part of the reading unit of the image forming apparatus.

Furthermore, as shown in FIGS. 4 to 6, the framework section of the body of the housing 10 has, as a body frame, a rear frame 12 disposed at the rear side of the image forming apparatus 1. In addition to the rear frame 12, the framework section of the body is formed of, for example, a combination of frames, such as a front frame (not illustrated), an upper frame (not illustrated), a left frame (not illustrated), a right frame (not illustrated), and multiple partition frames (not illustrated).

Furthermore, as illustrated in FIGS. 1 and 3, the outer section of the body of the housing 10 is formed of, for example, outer covers, such as a front cover 14a, a right cover 14d, a left cover (not illustrated), and a rear cover (not illustrated).

The outer covers are attached to some of the frames constituting the framework section of the body directly or by using an auxiliary attachment member, such as a bracket, and are detachably fixed to these frames by using a fixing member, such as a screw or a hook. Of the outer covers, for example, the front cover 14a and the right cover 14d are open-close covers that are at least partially openable and closable.

The image forming unit 20 is a component for forming an image corresponding to image information including text, a symbol, a graphic, a pattern, and/or a photograph onto a recording medium 9.

The image forming unit 20 according to the first exemplary embodiment is an electrophotographic image forming unit that ultimately forms an image formed of a developer onto the recording medium 9.

The electrophotographic image forming unit 20 includes an image bearing member (not illustrated), such as a photoconductor, devices (not illustrated) disposed around the image bearing member, such as a charging device, an exposure device, a developing device, a transfer device, and a cleaning device, and a fixing device (not illustrated) disposed at a position located away from the image bearing member. The image forming unit 20 also includes devices, such as a developer re-supplier, an image processor, and a controller.

The transfer device used is of a direct transfer type that directly transfers the developer image to be formed on the image bearing member onto the recording medium 9 or an intermediate transfer type that transfers the image from the image bearing member to the recording medium 9 via an intermediate transfer member.

The image forming unit 20 has a function for forming an image corresponding to image information input from an external device, such as a storage medium or an information terminal connected to the image forming apparatus 1, and a function for using information read by the reading unit 50 as image information, to be described later, and forming an image corresponding to the image information.

The image forming unit 20 sequentially performs predetermined operations, such as a charging operation around the image bearing member, an exposure operation corresponding to the image information, a developing operation, and a transfer operation.

Accordingly, in the image forming unit 20, the image formed of the developer is formed on the image bearing member, and the image is subsequently transferred directly or indirectly onto the recording medium 9 from the image bearing member. Moreover, in the image forming unit 20, a fixing operation is performed on the recording medium 9 having the image transferred thereon, whereby the image is fixed onto the recording medium 9.

The medium feed unit 30 is configured to accommodate the recording medium 9 to be used in the image forming unit 20 and to feed the recording medium 9 to the image forming unit 20.

The medium feed unit 30 according to the first exemplary embodiment is disposed below the image forming unit 20 and includes a container (not illustrated), such as a tray, accommodating the recording medium 9 and a delivery device (not illustrated) that delivers the recording medium 9 from the container.

The container is attached in a manner such that the container is drawable outward from inside the housing 10 to enable a process for accommodating the recording medium 9 therein. The container is not limited to a single container and may include multiple containers. The number of delivery devices disposed is equal in number to the number of containers. A medium transport path 35 that transports the recording medium 9 connects a part of the container where the delivery device is disposed to a part (i.e., a transfer unit) where the image transfer operation is performed in the image forming unit 20.

The recording medium 9 used is sheet-like plain paper, coated paper, or cardboard having a predetermined size.

In the medium feed unit 30, the predetermined recording medium 9 is delivered toward the transfer unit of the image forming unit 20 in accordance with the transfer operation in the image forming unit 20. The medium transport path 35 is provided to extend from the image forming unit 20 to an outlet 42 provided in the medium output unit 40.

The medium output unit 40 is configured to output the recording medium 9 having the image formed thereon in the image forming unit 20 and to accommodate the recording medium 9.

The medium output unit 40 according to the first exemplary embodiment is disposed above the image forming unit 20 and has an output space 41 that accommodates the recording medium 9 at an upper area of the front surface 10F of the housing 10. For example, the output space 41 is exposed outward via a front opening offset toward the right and a side opening extending continuously from the front surface 10F to the right side surface.

The medium output unit 40 is also provided with the outlet 42 for the recording medium 9 in the left inner wall surface of the output space 41. Moreover, the bottom surface of the output space 41 is provided with a load surface 43 that receives and accommodates the recording medium 9 output from the outlet 42.

The medium output unit 40 transports the recording medium 9 having the image formed and fixed thereon in the image forming unit 20 to the outlet 42 via the medium transport path 35, and subsequently outputs the recording medium 9 from the outlet 42 and accommodates the recording medium 9.

Reading Unit

The reading unit 50 is configured to read a read target object 90 placed on a base 6 from above the base 6.

As illustrated in FIGS. 1 to 3, the reading unit 50 according to the first exemplary embodiment includes a body 51 having the base 6 on which the read target object 90 is placed, a reader 7 that reads the read target object 90 placed on the base 6, and an operation unit 8 used for operating an apparatus by touching.

The apparatus to be operated by using the operation unit 8 is the image forming apparatus 1 including the reading unit 50.

The body 51 is a structural body having an internal framework section and an external outer section. Furthermore, the body 51 has the base 6 disposed on the upper surface thereof and contains therein relevant devices (not illustrated) related to the operation of the reader 7.

The body 51 according to the first exemplary embodiment is a part of the housing 10 of the image forming apparatus 1 and is disposed at the upper end of the housing 10.

The base 6 is formed of a tabular member having a flat upper surface 61 on which the read target object 90 is placeable in a stationary state. The base 6 is disposed at the upper end of the housing 10 such that the upper surface 61 serves as the uppermost surface.

The read target object 90 is placed on the base 6 so as to be readable from above the base 6 by the reader 7. Examples of the read target object 90 include a sheet-like document having image information recorded thereon, in addition to a three-dimensional object, such as a book, a magazine, a food item, or a plant.

The reader 7 is capable of optically reading the read target object 90 placed on the base 6. The reader 7 used is, for example, a camera including a combination of an imaging element, such as a charge-coupled device (CCD), and an optical element, such as a lens. The camera serving as the reader 7 may also be referred to as a graphic camera. The reader 7 may include an illuminator that illuminates the read target object 90 during a reading process.

As illustrated in FIGS. 1 to 6, the reader 7 is attached to a first attachment frame 73 disposed at a position above the base 6.

More specifically, as illustrated in FIG. 4, the reader 7 is attached by being fixed to a bracket 57 attached to a part (i.e., an upper-end connection portion 77) of the first attachment frame 73. Moreover, the reader 7 is disposed at a substantially center position in the left-right direction of the base 6.

The first attachment frame 73 is attached to the rear frame 12 of the housing 10. Furthermore, the first attachment frame 73 is disposed behind the operation unit 8.

A detailed description of the first attachment frame 73 will be provided later.

The reading unit 50 is configured to transmit the information read by the reader 7 to the image forming unit 20 so as to use the information as image information serving as a source for forming an image and also to use the information as display information to be displayed on a display of the operation unit 8.

Moreover, the reading unit 50 is configured to transmit the information read by the reader 7 to the image processor in the image forming unit 20 where the information is image-processed. The reading unit 50 may include an image processor that performs image-processing on the information read by the reader 7.

The operation unit 8 is a structural body at least having an operation section 81 used for operating the image forming apparatus 1 by touching.

The operation unit 8 is at least provided with the operation section 81 in a tabular body 80. In the operation unit 8, the body 80 may additionally be provided with a display 82 that displays various types of information (such as an image, a video, and so on).

In a case where the operation unit 8 has the display 82, the operation section 81 is constituted of a non-mechanical component, such as a touchscreen, operable by touching an area displayed on the display 82. A non-mechanical component employs an actuation method, such as a resistive film method or an electrostatic capacitive method, in which current application and positional detection are performed when the area displayed on the display 82 is touched with a finger or a pen.

Alternatively, the operation section 81 may be constituted of a mechanical component, such as a physical button or a physical switch, operable by being touched and physically moved by the user of the image forming apparatus 1 with a finger. As another alternative, the operation section 81 may have a mixture of the aforementioned non-mechanical component and the aforementioned mechanical component.

The display 82 is constituted of a display device, such as a liquid crystal display panel. In a case where the operation section 81 is constituted of the aforementioned non-mechanical component, the display 82 also displays an operation screen to be used in the operation section 81.

As illustrated in FIG. 4, the operation unit 8 according to the first exemplary embodiment includes both an operation section 81a constituted of the aforementioned non-mechanical component within the display 82 and an operation section 81b constituted of the aforementioned mechanical component. As illustrated in FIG. 4, in the operation unit 8, the display 82 also serving as the operation section 81 is disposed at the front surface of the body 80.

The operation unit 8 including the operation section 81a within the display 82 is also referred to as, for example, a touchscreen or a touch display.

As illustrated in FIGS. 1 to 5, the operation unit 8 is attached to a second attachment frame 85 so as to be disposed above the base 6 and below the reader 7. The operation unit 8 is disposed at a substantially center position in the left-right direction of the base 6.

Therefore, as illustrated in FIGS. 2 and 5, as compared with the position of the reader 7, the operation unit 8 has a positional relationship therewith such that the center positions of both the operation unit 8 and the reader 7 in the left-right direction are substantially aligned with each other.

As illustrated in FIG. 5, the operation unit 8 has a width W2 in the left-right direction that is smaller than a width W1 of the rear frame 12 in the left-right direction.

The second attachment frame 85 supports the operation unit 8 at the rear surface thereof. Moreover, the second attachment frame 85 is disposed behind the base 6 and in front of the first attachment frame 73 that supports the reader 7. Furthermore, the second attachment frame 85 is attached to the rear frame 12 of the housing 10.

A detailed description of the second attachment frame 85 will be provided later.

Furthermore, as illustrated in FIG. 6, the operation unit 8 is attached to the upper end of the second attachment frame 85 with a bracket 58 interposed therebetween.

The bracket 58 includes a fixed portion 58A fixed to the upper end of the second attachment frame 85 and a movable support portion 58B that is attached to the fixed portion 58A in a vertically rotatable manner by a support shaft 58g and that supports the operation unit 8 by being attached to the rear surface of the body 80 thereof.

The operation unit 8 is attached to the bracket 58 having the movable support portion 58B, so as to be supported in a manner such that a tilt angle of an operation surface is adjustable by rotating the operation unit 8 within a predetermined range around the support shaft 58g.

As illustrated in FIGS. 1 to 3, in the reading unit 50, the entire first attachment frame 73 to which the operation unit 8 is attached and a part of the second attachment frame 85 to which the operation unit 8 is attached are covered with a frame cover 15 serving as an example of an outer cover. Furthermore, in the reading unit 50, the reader 7 is covered with a device cover 17 serving as an example of an outer cover.

The frame cover 15 is a cover that uses, for example, a combination of three portions split in the vertical direction, namely, a lower cover portion 15a, an intermediate cover portion 15b, and an upper cover portion 15c. The lower cover portion 15a, the intermediate cover portion 15b, and the upper cover portion 15c may each be further split into smaller cover portions by being split into a front portion and a rear portion.

The frame cover 15 is attached to the first attachment frame 73 directly or by using an auxiliary attachment member, such as a bracket, and is detachably fixed to the first attachment frame 73 by using a fixing member, such as a screw or a hook.

Furthermore, for example, the frame cover 15 has an external shape with a rectangular space S1 conforming to the shape of the first attachment frame 73 (i.e., the shape of a space S2 therein, as illustrated in FIG. 4).

As illustrated in FIGS. 1 and 2, the lower cover portion 15a of the frame cover 15 partially serves as a split cover portion 15d that is split to cover the periphery of the second attachment frame 85. The split cover portion 15d is shaped so as not to come into contact with the second attachment frame 85 or is configured to come into contact with the second attachment frame 85 via an elastic cushioning material.

As illustrated in FIGS. 1 and 2, the intermediate cover portion 15b of the frame cover 15 serves as a cover portion with a shape that allows the space S1 to exist therein.

Furthermore, as illustrated in FIGS. 1 to 3, the upper cover portion 15c of the frame cover 15 has an eaves-like external shape that extends diagonally upward from the upper end of the first attachment frame 73 to cover the reader 7 from thereabove.

The device cover 17 is a cover independent of the upper cover portion 15c. Alternatively, the device cover 17 may be a cover integrated with the upper cover portion 15c. In other words, the device cover 17 may be a cover formed as a part of the upper cover portion 15c.

In the first exemplary embodiment, a frame having the following configuration is used as the rear frame 12 serving as an example of the body frame to which the first attachment frame 73 and the second attachment frame 85 are attached.

Specifically, as illustrated in FIGS. 4 to 6 and FIG. 9, the rear frame 12 according to the first exemplary embodiment includes a body surface 12a, an upper end surface 12b, left and right end surfaces 12c and 12d, and a lower end surface (not illustrated).

The body surface 12a is a frame portion serving as a body portion having an external shape with a substantially rectangular surface extending in the up-down direction. The upper end surface 12b is a frame portion having a surface bent rearward substantially at a right angle from the upper end of the body surface 12a.

The left and right end surfaces 12c and 12d are frame portions each having a surface bent rearward substantially at a right angle from the left or right end of the body surface 12a. The lower end surface (not illustrated) is a frame portion having a surface bent rearward substantially at a right angle from the lower end of the body surface 12a.

First Attachment Frame

In the first exemplary embodiment, as illustrated in FIGS. 4 to 7, a frame having two frame portions 74A and 74B extending upward at positions located away from each other is used as the first attachment frame 73 to which the reader 7 is attached.

Figure 7:
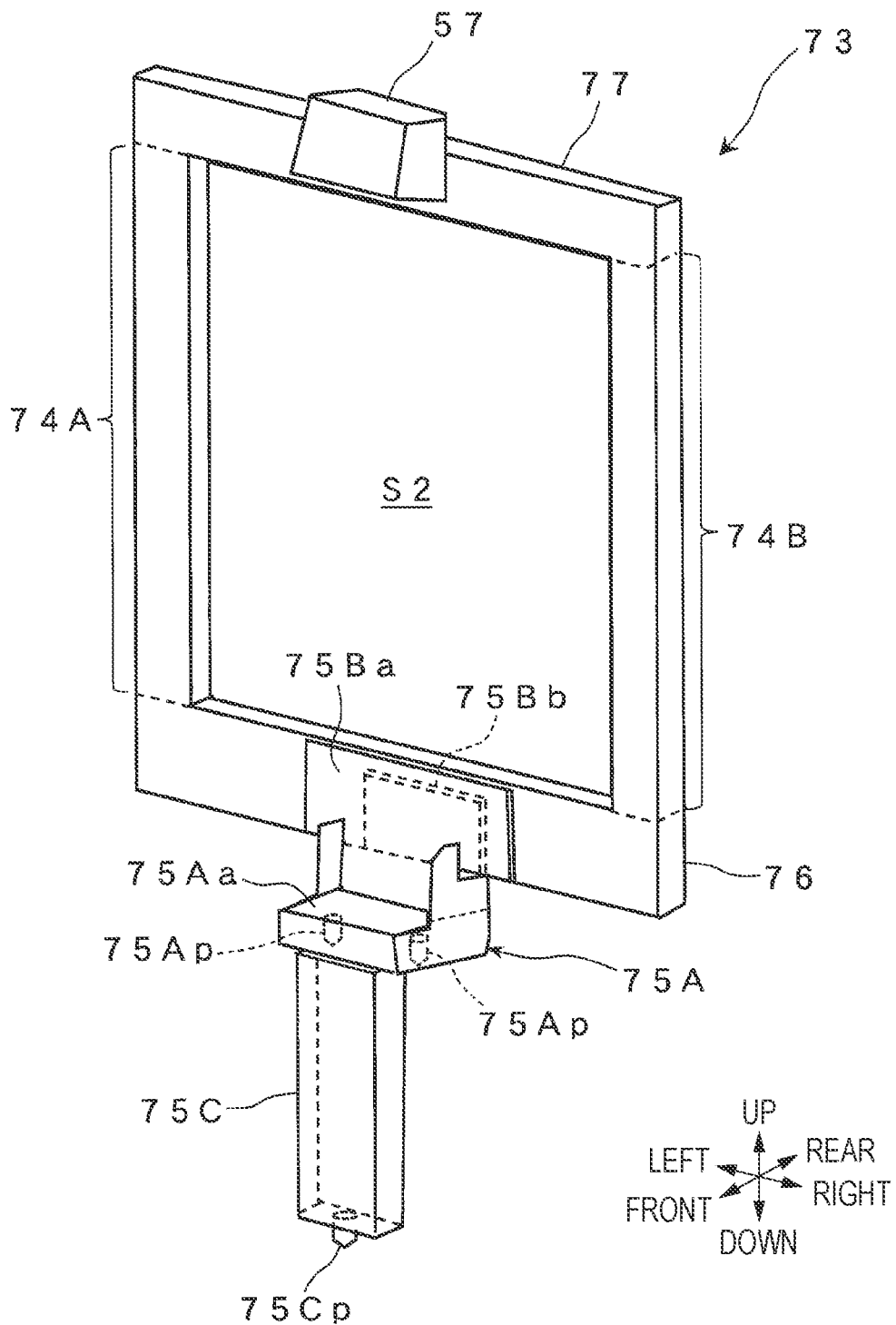
FIG. 7 is a perspective view schematically illustrating a first attachment frame.

In detail, as illustrated in FIG. 7, the first attachment frame 73 according to the first exemplary embodiment has an upright base portion 75, a branch portion 76, the two frame portions 74A and 74B, and the upper-end connection portion 77.

The upright base portion 75 of the first attachment frame 73 is a frame portion attached to the rear frame 12 and standing upright above the base 6.

The upright base portion 75 includes a box-shaped base 75A attached to an attachment recess 12f at the upper end (i.e., the upper end surface 12b) of the rear frame 12, an upright holder 75B that stands upright from the rear end of the base 75A and that holds the branch portion 76, and an attachment part 75C that extends downward from the front end of the base 75A and that is attached while being accommodated within an attachment container 13 at the body surface 12a of the rear frame 12.

Figure 9:
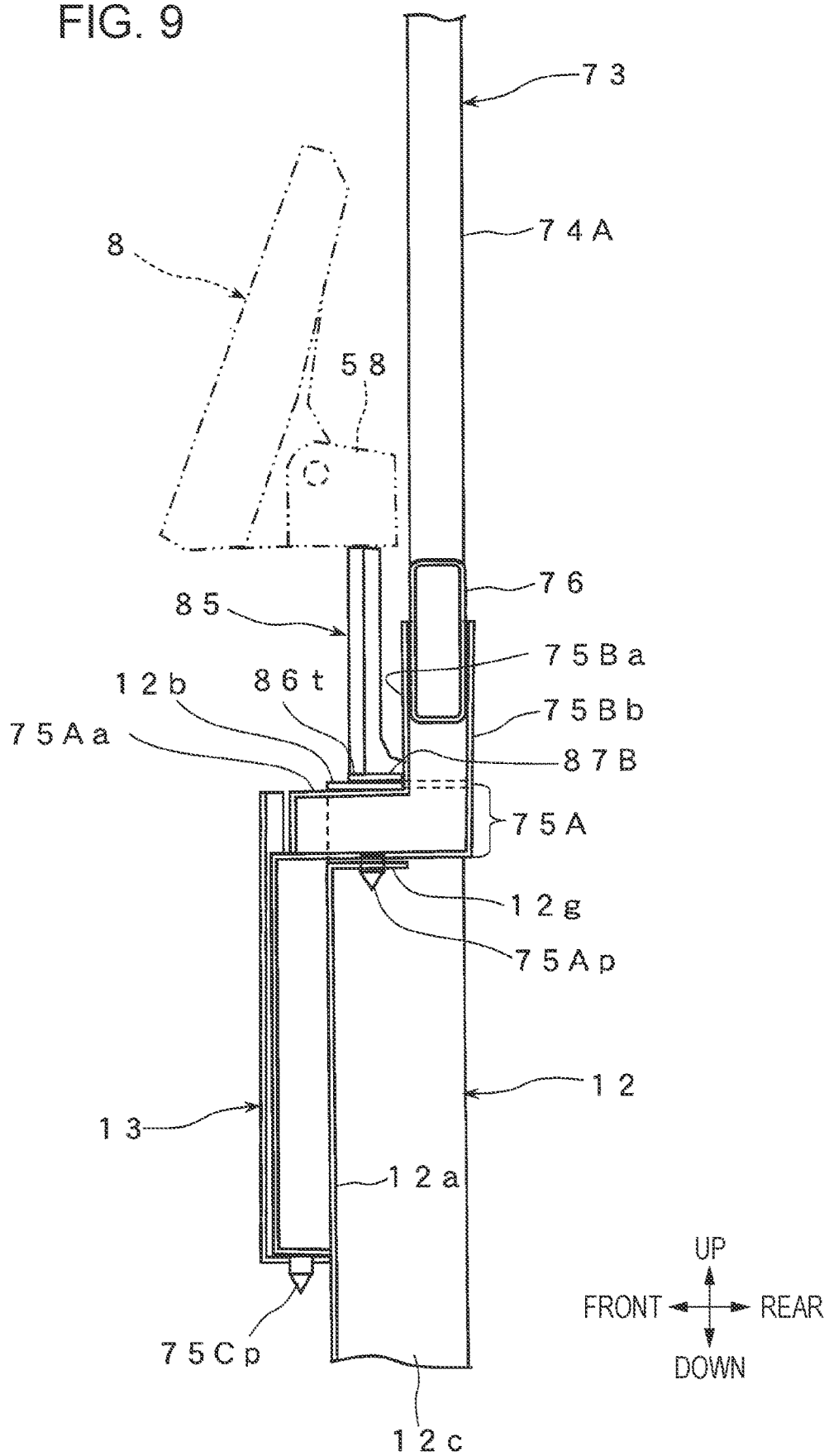
FIG. 9 is a cross-sectional view schematically illustrating an area where the first attachment frame is attached to a rear frame.

As illustrated in FIGS. 7 and 9, the base 75A of the upright base portion 75 has a lower surface provided with a positioning pin 75Ap that protrudes downward so as to be fitted in a positioning hole provided in the attachment recess 12f.

The upright holder 75B of the upright base portion 75 is provided with a pair of front and rear holder plates 75Ba and 75Bb that hold the central area of the branch portion 76 while sandwiching front and rear surfaces thereof from the front and rear sides.

The attachment part 75C of the upright base portion 75 is a tabular part that extends downward from the front end of the base 75A and whose lower end subsequently bends rearward. The bent area of the lower end of the attachment part 75C is provided with a pin 75Cp that protrudes downward so as to be fitted in a positioning hole provided in the attachment container 13.

As illustrated in FIG. 8, the attachment recess 12f in the rear frame 12 is a structural area obtained by cutting out a central area, in the left-right direction, of the upper end surface 12b of the rear frame 12 into a recessed shape to accommodate the base 75A of the upright base portion 75.

As illustrated in FIG. 9, the bottom of the attachment recess 12f is provided with a bent surface 12g obtained by partially bending the body surface 12a of the rear frame 12 rearward substantially by a right angle. The bent surface 12g is provided with a positioning hole in which the positioning pin 75Ap of the base 75A is fitted.

As illustrated in FIGS. 4 to 6 and FIG. 9, the attachment container 13 in the rear frame 12 is a part provided with a frame body that has a vertically-long container (i.e., a space) with an upper opening formed in an area provided with the attachment recess 12f and an area therebelow in the body surface 12a of the rear frame 12.

The left and right side surfaces at the upper end of the attachment container 13 are provided with cutouts on which the left and right corners of the front end of the base 75A are placed in a state where the left and right corners protrude leftward and rightward, respectively. The bottom surface of the attachment container 13 is provided with a positioning hole in which the positioning pin 75Cp of the attachment part 75C is fitted.

As illustrated in FIGS. 7 and 9, the branch portion 76 of the first attachment frame 73 is a frame portion formed of an angular pipe extending linearly in the left-right direction.

As illustrated in FIGS. 4 and 5, the branch portion 76 has a length substantially equal to the width W1 of the rear frame 12 in the left-right direction.

Furthermore, the central area of the branch portion 76 in the left-right direction is held by being fixed using a fixing technique, such as screwing or welding, while being sandwiched between the pair of front and rear holder plates 75Ba and 75Bb of the upright holder 75B of the upright base portion 75.

As illustrated in FIGS. 4, 5, and 7, the two frame portions 74A and 74B of the first attachment frame 73 are frame portions formed of angular pipes extending linearly upward in the up-down direction.

As illustrated in FIGS. 4 and 5, the frame portions 74A and 74B each have a length such that the upper end thereof reaches a height where the upper end is located above the operation unit 8 and distant therefrom by a predetermined distance.

As illustrated in FIG. 7, the frame portions 74A and 74B extend upward substantially orthogonally from the left and right ends of the branch portion 76 in the lateral direction serving as the left-right direction thereof.

In this case, for example, each of the lower ends of the frame portions 74A and 74B is provided with a pair of front and rear attachment plates (not illustrated) to be attached while sandwiching the left or right end of the branch portion 76 from the front and rear sides, and is also provided with an attachment plate serving as a left or right side surface (not illustrated) to be attached in contact with the left or right side so as to surround the left or right side. The frame portions 74A and 74B are respectively fixed to the left and right ends of the branch portion 76 with the attachment plates interposed therebetween by using a fixing technique, such as screwing or welding. Furthermore, in this case, the upper ends of the frame portions 74A and 74B are respectively fixed to the left and right ends of the upper-end connection portion 77, which will be described below.

As illustrated in FIG. 7, the upper-end connection portion 77 of the first attachment frame 73 is a frame portion formed of an angular pipe extending linearly in the left-right direction.

As illustrated in FIGS. 4, 5, and 7, the upper-end connection portion 77 has a length substantially equal to the width W1 of the rear frame 12 in the left-right direction. In other words, the upper-end connection portion 77 has a length substantially equal to the length of the branch portion 76.

Furthermore, as illustrated in FIG. 7, the upper-end connection portion 77 has left and right ends in the left-right direction that are respectively connected to the upper ends of the frame portions 74A and 74B.

In this case, for example, each of the left and right ends of the upper-end connection portion 77 is provided with a pair of front and rear attachment plates (not illustrated) to be attached while sandwiching the upper end of the frame portion 74A or 74B from the front and rear sides, and is also provided with an attachment plate serving as a left or right side surface (not illustrated) to be attached in contact with the left or right side so as to surround the left or right side. The upper-end connection portion 77 is fixed to the upper ends of the frame portions 74A and 74B with the attachment plates interposed therebetween by using a fixing technique, such as screwing or welding.

As illustrated in FIG. 9, the first attachment frame 73 having the above-described configuration has the rectangular space S2 surrounded by the branch portion 76, the two frame portions 74A and 74B, and the upper-end connection portion 77.

The first attachment frame 73 is attached to the rear frame 12 in the following manner.

Specifically, as illustrated in FIG. 9, the first attachment frame 73 is installed by positioning the base 75A of the upright base portion 75 in the attachment recess 12f of the rear frame 12 via the positioning pin 75Ap. Furthermore, as illustrated in FIG. 9, the first attachment frame 73 is fixed by fitting and positioning the front end of the base 75A and the attachment part 75C of the upright base portion 75 into the attachment container 13 of the rear frame 12 via the positioning pin 75Cp.

Accordingly, as illustrated in FIGS. 4 to 6 and FIG. 9, the first attachment frame 73 is attached to the rear frame 12.

In this case, with regard to the first attachment frame 73, the branch portion 76 is held by the upright base portion 75 and is located above and away from the base 6.

Furthermore, with regard to the first attachment frame 73, the base 75A of the upright base portion 75 is completely fitted in the attachment recess 12f of the rear frame 12, and an upper surface 75Aa of the base 75A is accommodated within the attachment recess 12f at a height equal to or lower than the height of the upper end surface 12b of the rear frame 12.

Moreover, as illustrated in FIG. 5, the first attachment frame 73 is disposed such that the entire frame portions 74A and 74B including the lower areas thereof are at least located outward of and away from the second attachment frame 85 of the operation unit 8 in the left-right direction. Accordingly, a minimal path length from where the second attachment frame 85 of the operation unit 8 is attached to the rear frame 12 to the reader 7 via the first attachment frame 73 may be increased, as compared with a case where the entire frame portions 74A and 74B including the lower areas thereof are hidden directly behind the second attachment frame 85 of the operation unit 8 or a case where the frame portions 74A and 74B partially overlap the second attachment frame 85.

Furthermore, in order to locate the frame portions 74A and 74B according to the first exemplary embodiment further away from the second attachment frame 85 from the standpoint of suppressing vibration transmission, the frame portions 74A and 74B are respectively located outward of and away from the left and right ends 8a and 8b of the operation unit 8 in the left-right direction. In this case, as illustrated in FIG. 5, the frame portions 74A and 74B are disposed such that a distance (i.e., a separation distance) D therebetween in the left-right direction is larger than the width W2 of the operation unit 8 in the left-right direction. With this arrangement, the aforementioned minimal path length may be further increased.

Furthermore, as illustrated in FIGS. 4 and 5, the reader 7 according to the first exemplary embodiment is attached to the first attachment frame 73 by using the bracket 57 attached to a substantially center position, in the left-right direction, of the upper-end connection portion 77 of the first attachment frame 73.

Second Attachment Frame

As illustrated in FIGS. 4, 5, 8, and 9, in the first exemplary embodiment, a frame attached to the rear frame 12 and protrudable upward above the base 6 is used as the second attachment frame 85 to which the operation unit 8 is attached.

In detail, as illustrated in FIG. 8, the second attachment frame 85 according to the first exemplary embodiment is a frame including an upright body 86 and left and right attachment parts 87A and 87B. Furthermore, in the second attachment frame 85, the bracket 58 to which the operation unit 8 is attached is attached to the upper end of the upright body 86.

The upright body 86 of the second attachment frame 85 is a frame portion including a rectangular tabular body surface 86A standing upright from the upper end of the rear frame 12, left and right side surfaces 86B and 86C bent rearward substantially at a right angle from the left and right ends of the body surface 86A, and an upper surface 86D that couples the upper end of the body surface 86A to the upper ends of the left and right side surfaces 86B and 86C.

As illustrated in FIG. 8, the body surface 86A has a lower end 86t with a width (i.e., a length) substantially equal to or smaller than a width Wf, in the left-right direction, of the attachment recess 12f of the rear frame 12. Accordingly, when the second attachment frame 85 is attached to the rear frame 12, the body surface 86A is disposed over or astride the attachment recess 12f. Furthermore, the central area of the body surface 86A in the left-right direction is provided with a reinforcement groove 86E recessed rearward and extending in the up-down direction.

As illustrated in FIG. 8, the left and right attachment parts 87A and 87B of the second attachment frame 85 are tabular frame portions protruding leftward and rightward, respectively, from the lower ends of the left and right side surfaces 86B and 86C of the upright body 86. The left and right attachment parts 87A and 87B are disposed in contact with areas of the upper end surface 12b located at the left and right sides of the attachment recess 12f of the rear frame 12.

In a case where an upper-end bent rear surface that is bent downward is provided at the rear end of the upper end surface 12b of the rear frame 12, the left and right attachment parts 87A and 87B may be frame portions each having a rear-end bent part 87C (see FIG. 8) bent in conformity to the upper-end bent rear surface. In FIG. 8, each reference sign 87h denotes a screw through-hole for inserting a fixing screw therethrough.

As illustrated in FIGS. 6 and 8, in the second attachment frame 85, a substantially central area, in the left-right direction, of the upper surface 86D of the upright body 86 is provided with the bracket 58 to which the operation unit 8 is attached.

The bracket 58 includes, for example, the fixed portion 58A securely attached to the upper surface 86D of the upright body 86 and the movable support portion 58B that is attached to the fixed portion 58A in a vertically rotatable manner by the support shaft 58g and that supports the operation unit 8. In FIG. 8, each reference sign 58h denotes a screw through-hole for inserting a fixing screw therethrough.

The second attachment frame 85 having the above-described configuration is attached to the rear frame 12 in the following manner.

Specifically, as illustrated in FIG. 9, the second attachment frame 85 is installed by positioning the base 75A of the upright base portion 75 in the attachment recess 12f of the rear frame 12 via the positioning pin 75Ap. Furthermore, as illustrated in FIG. 9, the first attachment frame 73 is positioned using the positioning pin 75Cp by accommodating the front end of the base 75A and the attachment part 75C of the upright base portion 75 in the attachment container 13 of the rear frame 12.

Accordingly, as illustrated in FIGS. 4 to 6 and FIG. 9, the second attachment frame is attached to the rear frame 12.

In this case, with regard to the second attachment frame 85, as illustrated in FIGS. 8 and 9, the lower end 86t of the upright body 86 faces the upper surface 75Aa of the base in the upright base portion 75 of the first attachment frame 73 with a distance therebetween. Accordingly, the second attachment frame 85 is attached to the rear frame 12 without being in contact with the first attachment frame 73.

As illustrated in FIGS. 6 and 9, the second attachment frame 85 is entirely disposed without being in contact with the entire first attachment frame 73.

As illustrated in FIG. 6, the operation unit 8 according to the first exemplary embodiment is attached to the second attachment frame 85 with the bracket 57 interposed therebetween. The bracket 57 is attached to a substantially center position, in the left-right direction, of the upper surface 86D of the second attachment frame 85.

Lastly, the frame cover 15 is attached so as to entirely cover the first attachment frame 73 and partially cover the second attachment frame 85, and the device cover 17 is attached so as to cover the reader 7, whereby a part of the reading unit 50 excluding the base 6 is completed.

As a result, as illustrated in FIGS. 1 to 3, the reading unit 50 has the first attachment frame 73 entirely covered by the frame cover 15 and the second attachment frame 85 partially covered by the frame cover 15, and has the reader 7 covered by the device cover 17. In this case, with regard to the frame cover 15, the split cover portion 15d included in the lower cover portion 15a thereof is not in contact with the second attachment frame 85 or is in contact therewith with a cushioning material interposed therebetween.

The base 6 is attached to the upper end of the housing 10 of the image forming apparatus 1 (or the body 51 of the reading unit 50), whereby the reading unit 50 is completed.

Usage and Operation of Image Forming Apparatus and Reading Unit

The image forming apparatus 1 having the above-described configuration is capable of causing the image forming unit 20 to form an image corresponding to image information input from a connected external device onto the recording medium 9. In this case, the recording medium 9 having the image formed thereon is discharged and output to the medium output unit 40.

Furthermore, the image forming apparatus 1 is capable of causing the reader 7 in the reading unit 50 to read the read target object 90 placed on the base 6 and causing the display 82 of the operation unit 8 to display the read information as a read image.

Moreover, the image forming apparatus 1 is capable of loading the read information of the read target object 90 obtained by the reading unit 50 as image information into the image forming unit 20 and forming an image corresponding to the image information onto the recording medium 9. Accordingly, the image forming apparatus 1 is also capable of recording the image read from the read target object 90 onto the recording medium 9 and outputting the recording medium 9.

For example, when the reading unit 50 is to perform a reading process on the read target object 90 in the image forming apparatus 1, a user uses the operation unit 8 to operate the apparatus, thereby starting the reading process.

In this case, when the user operates the operation unit 8 to start the reading process, the reader 7 operates to read the read target object 90 placed on the base 6.

However, when this reading process starts, the operation unit 8 is vibrated due to the user touching and manually operating the operation unit 8. Therefore, in the reading unit 50, the vibration may be transmitted from the second attachment frame 85, to which the operation unit 8 is attached, toward the first attachment frame 73, to which the reader 7 is attached, via the rear frame 12, and may ultimately be transmitted to the reader 7, possibly causing the reader 7 to shake.

When such shaking of the reader 7 occurs, the read information obtained by the shaking reader 7 becomes distorted. As a result, when the read information is displayed on the display 82, the displayed image becomes distorted. When the image forming unit 20 forms an image by using the read information as image information, the formed image is distorted.

In this regard, in the image forming apparatus 1, a frame having the two frame portions 74A and 74B extending upward at positions located away from each other is used as the first attachment frame 73 to which the reader 7 is attached in the reading unit 50.

Figure 18:
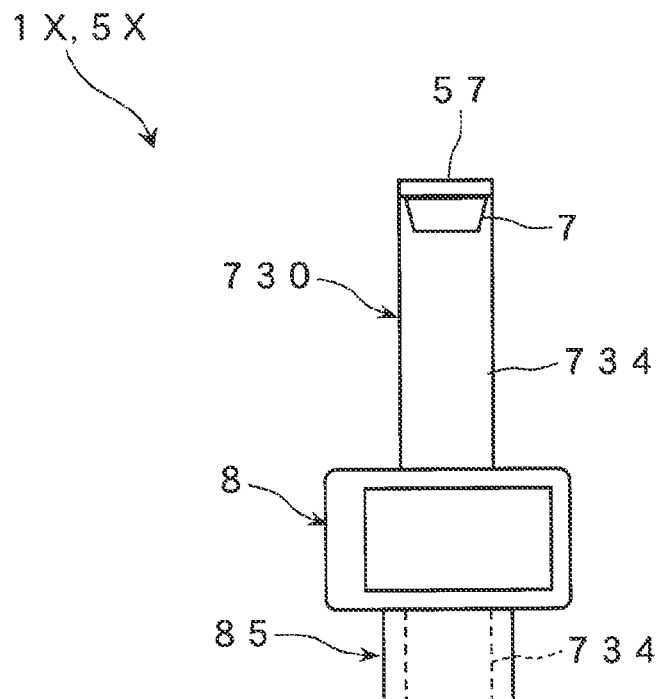
FIG. 18 is a front view schematically illustrating an image forming apparatus or a reading device equipped with a first attachment frame according to the comparative example.

Therefore, in the image forming apparatus 1, the shaking of the reader 7 occurring when the user touches the operation unit 8 to operate the apparatus may be suppressed in a case where the read target object 90 is placed on the base 6 and is read by the reader 7, as compared with a case illustrated in FIG. 18 (i.e., an image forming apparatus 1X or a reading device 5X according to a comparative example) in which the reader 7 is attached to a single first attachment frame 730 extending upward from the rear frame 12 at a position directly behind the second attachment frame 85.

Furthermore, in the image forming apparatus 1, when the image corresponding to the information read by the reader 7 is to be formed, deterioration of image quality due to shaking of the reader 7 may be suppressed.

The single first attachment frame 730 according to the comparative example mentioned above is a single frame that extends from the rear frame 12 serving as an example of a body frame to an area where the reader 7 is attached, and that does not have any other frames (parts).

In the image forming apparatus 1, the split cover portion 15d of the lower cover portion 15a is in a noncontact state with the second attachment frame 85 or is in a contact state therewith with a cushioning material interposed therebetween, so that a vibration occurring when the operation unit 8 is touched for operating the apparatus is not transmitted from the second attachment frame 85 to the reader 7 via the frame cover 15.

Moreover, since the second attachment frame 85 is attached to the rear frame 12 without being in contact with the first attachment frame 73 in the image forming apparatus 1, a vibration occurring when the operation unit 8 is touched for operating the apparatus is not directly transmitted from the second attachment frame 85 to the first attachment frame 73.

Measurement Test

Figure 10A:
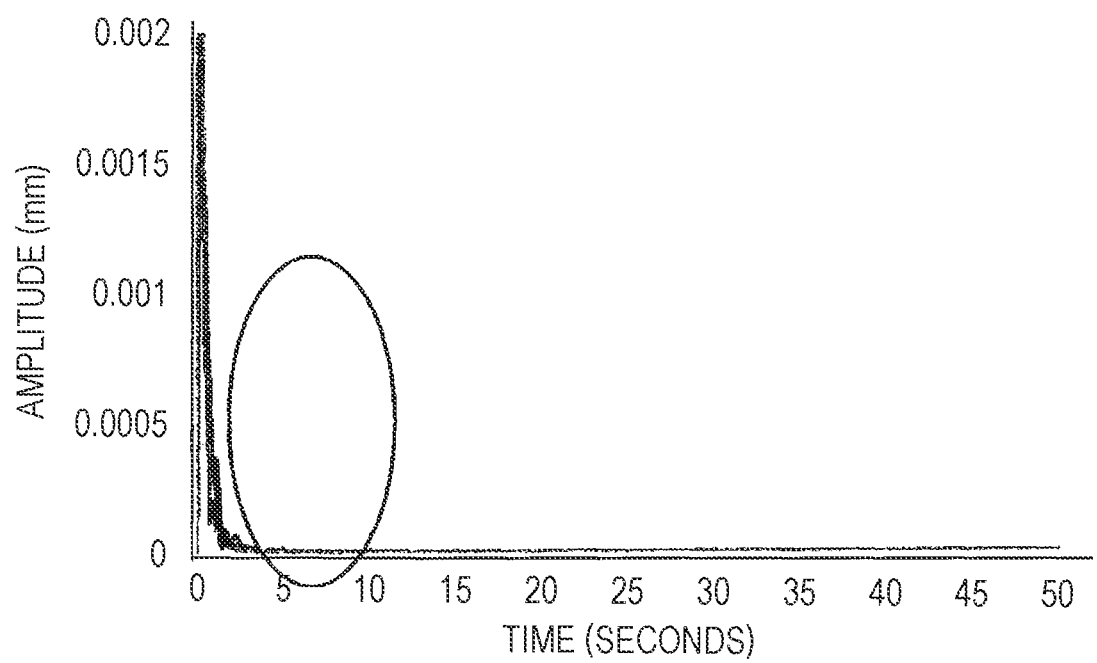
FIG. 10A is a graph illustrating a measurement test result according to a practical example.

FIG. 10A is a graph illustrating a result of a measurement test performed on the image forming apparatus 1 or the reading unit 50 according to the first exemplary embodiment (practical example).

The measurement test involves measuring the state of a vibration occurring in the reader 7 when the operation unit 8 in the reading unit 50 is touched for operating the image forming apparatus 1, that is, the amplitude of a vibration occurring after a predetermined time period (e.g., 50 seconds) has elapsed since the operation unit 8 is touched.

In this case, the measurement of the amplitude of the vibration is performed at a root section of the first attachment frame 73 (e.g., the base 75A of the upright base portion and at an upper section of the first attachment frame 73 (e.g., the attachment bracket 57 of the reader 7) as measurement target positions by using a multi-unit data collection system (NR-500 series manufactured by Keyence Corporation). The result indicated in FIG. 10A is a measurement result obtained at the upper section of the first attachment frame 73.

The measurement test is similarly performed on a comparative example by using the image forming apparatus 1X (comparative example) having the reader 7 attached to the single upward-extending first attachment frame 730 illustrated in FIG. 18.

Figure 10B:
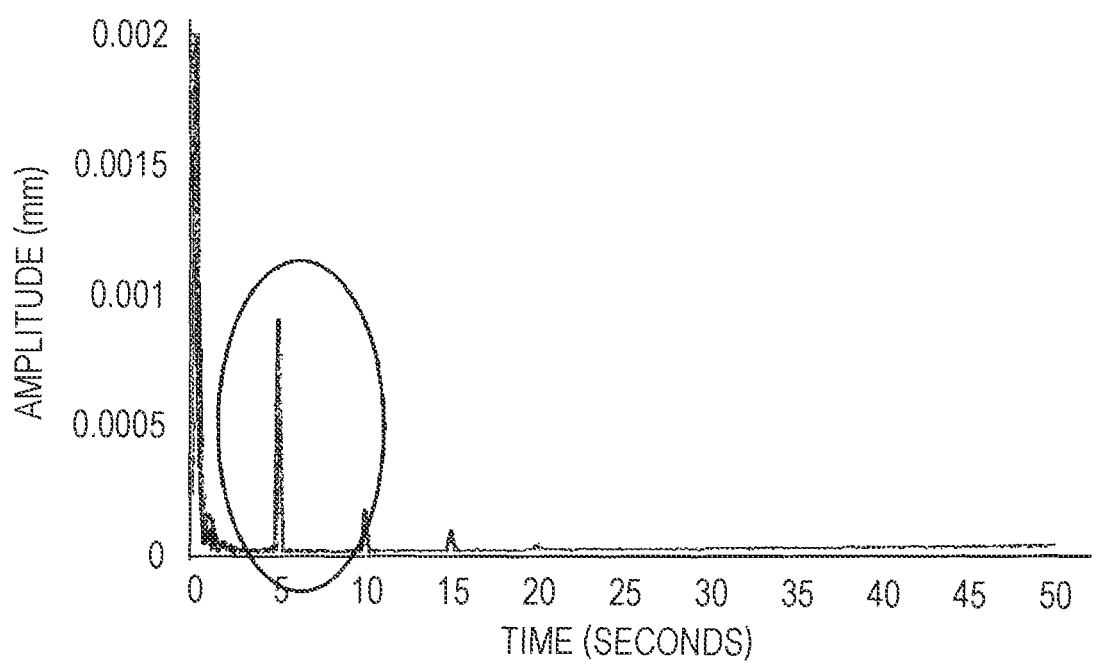
FIG. 10B is a graph illustrating a measurement test result according to a comparative example.

The measurement test result according to the comparative example is as illustrated in FIG. 10B.

As illustrated in FIG. 18, the first attachment frame 730 of the image forming apparatus 1X according to the comparative example has a structure obtained by providing the upright base portion 75 (see FIG. 7) of the first attachment frame 73 according to the practical example with a single frame portion 734 extending linearly upward. Furthermore, the first attachment frame 730 has the reader 7 attached to the upper end of the frame portion 734 with the bracket 57 interposed therebetween.

In the image forming apparatus 1X or the reading device 5X according to the comparative example, the operation unit 8 is attached to a frame similar to the second attachment frame 85 according to the first exemplary embodiment.

When viewed from the front surface 10F of the image forming apparatus 1X, the frame portion 734 of the first attachment frame 730 is disposed at a position directly behind the second attachment frame 85 or in a state where the frame portion 734 at least partially overlaps the second attachment frame 85.

It is clear from the results illustrated in FIGS. 10A and 10B that, in the comparative example, a vibration with a relatively large amplitude (i.e., a first wave) is generated and transmitted five seconds after the operation unit 8 is touched, as indicated with an oval area in FIG. 10B, and the vibration subsequently disappears after the amplitude thereof greatly attenuates at approximately five second intervals.

In contrast, in the practical example, a vibration having the first wave as in the comparative example has not occurred, as indicated with an oval area in FIG. 10A.

In this measurement test, a sheet having a test pattern image recorded thereon is placed on the base 6 and is read by the reader 7, and an image is formed on the recording medium 9 by using the read information as image information.

As a result, in contrast to the comparative example in which the test pattern image is a distorted copy image, the test pattern image obtained in the practical example is a clear copy image.

It is assumed that the shaking of the reader 7 may be suppressed in the first exemplary embodiment due to the following reasons.

Specifically, in the reading unit 50 of the image forming apparatus 1, a vibration occurring when the operation unit 8 is touched for operating the apparatus is transmitted from the second attachment frame 85 to the rear frame 12, as indicated by arrows v1 in FIGS. 11A and 11B. In this case, the vibration is transmitted to the rear frame 12 via the left and right attachment parts 87A and 87B of the second attachment frame 85, as indicated by the arrows v1 in FIG. 11A.

Then, if the vibration is transmitted from the rear frame 12 to the first attachment frame 73, the vibration is transmitted distributively through the two frame portions 74A and 74B extending upward at positions located away from each other. In this case, as indicated by an arrow v2 in FIG. 11B, the vibration is transmitted from the rear frame 12 to the upright base portion 75 of the first attachment frame 73 and is subsequently split into the left and right sides at the branch portion 76 so as to be transmitted through the frame portions 74A and 74B, as indicated by arrows v3 and v4 in FIG. 11A.

Therefore, when a vibration is transmitted from the rear frame 12 to the first attachment frame 73, the vibration is transmitted from the branch portion 76 distributively through the frame portions 74A and 74B, so as to attenuate and sometimes disappear before reaching the reader 7. In FIGS. 11A and 11B, a double arrow denoted by reference sign Sh indicates shaking of the reader 7 when the vibration reaches the reader 7.

Accordingly, in the reading unit 50 of the image forming apparatus 1, it is conceivable that the shaking of the reader 7 attached to the first attachment frame 73 may be suppressed.

Furthermore, in the reading unit 50 of the image forming apparatus 1 according to the first exemplary embodiment, the first attachment frame 73 is disposed such that the entire frame portions 74A and 74B including the lower areas thereof are located outward of and away from the second attachment frame 85 of the operation unit 8 in the left-right direction.

Therefore, in the image forming apparatus 1, a vibration occurring when the operation unit 8 is touched for operating the apparatus is transmitted along a long path, as compared with a case where at least the lower areas of the frame portions 74A and 74B are disposed inward and rearward of the second attachment frame 85, so that transmission of the vibration from the second attachment frame 85 to the first attachment frame 73 via the rear frame 12 may be suppressed.

In addition, in the first exemplary embodiment, the frame portions 74A and 74B are disposed at positions located outward of and away from left and right ends 8a and 8b of the operation unit 8 in the left-right direction.

Therefore, in the image forming apparatus 1, a vibration occurring when the operation unit 8 is touched for operating the apparatus is transmitted along an even longer path, as compared with a case where at least the lower areas of the frame portions 74A and 74B are disposed inward of the left and right ends 8a and 8b of the operation unit 8, so that transmission of the vibration from the second attachment frame 85 to the first attachment frame 73 via the rear frame 12 may be readily suppressed.

In the reading unit 50 of the image forming apparatus 1, the first attachment frame 73 includes the upper-end connection portion 77 that extends laterally and that connects the upper ends of the frame portions 74A and 74B to each other.

Therefore, in the image forming apparatus 1, the distance from the frame portions 74A and 74B to the reader 7 is increased, and the mechanical strength of the first attachment frame 73 is increased, so that a vibration may less likely be transmitted therethrough. Consequently, when the operation unit 8 is touched for operating the apparatus, transmission of a vibration from the first attachment frame 73 to the reader 7 may be further suppressed.

Furthermore, in the reading unit 50 of the image forming apparatus 1, the first attachment frame 73 includes the upright base portion 75 attached to the rear frame 12 and the branch portion 76 branching off laterally from the upper end of the upright base portion 75, and the frame portions 74A and 74B extend upward from the branch portion 76.

Therefore, in the image forming apparatus 1, the path from the rear frame 12 to the frame portions 74A and 74B of the first attachment frame 73 is made longer. When the operation unit 8 is touched for operating the apparatus, transmission of a vibration from the body frame to the multiple frame portions may be suppressed, as compared with a case where the rear frame 12 is directly provided with the frame portions 74A and 74B.

Second Exemplary Embodiment

Figure 12:
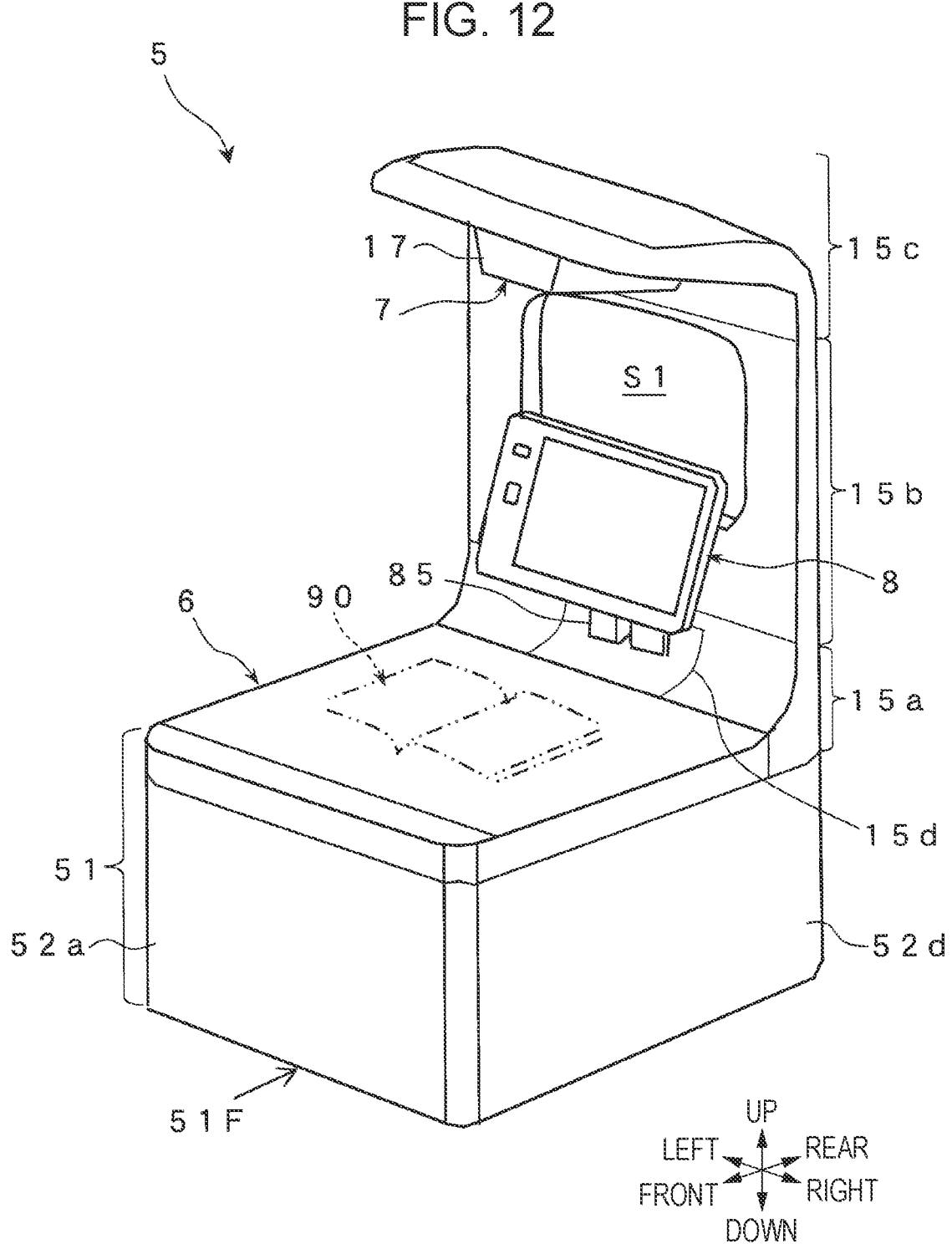
FIG. 12 is a perspective view schematically illustrating a reading device according to a second exemplary embodiment.

FIG. 12 is a perspective view schematically illustrating a reading device 5 according to a second exemplary embodiment of the present disclosure.

The reading device 5 according to the second exemplary embodiment is obtained by separating the reading unit 50 in the image forming apparatus 1 according to the first exemplary embodiment from the housing 10 of the image forming apparatus 1.

Specifically, as illustrated in FIG. 12, the reading device 5 includes the body 51 having the base 6 on which the read target object 90 is placed, the reader 7 that reads the read target object 90 placed on the base 6, and the operation unit 8 used for operating the device by touching.

Figure 13:
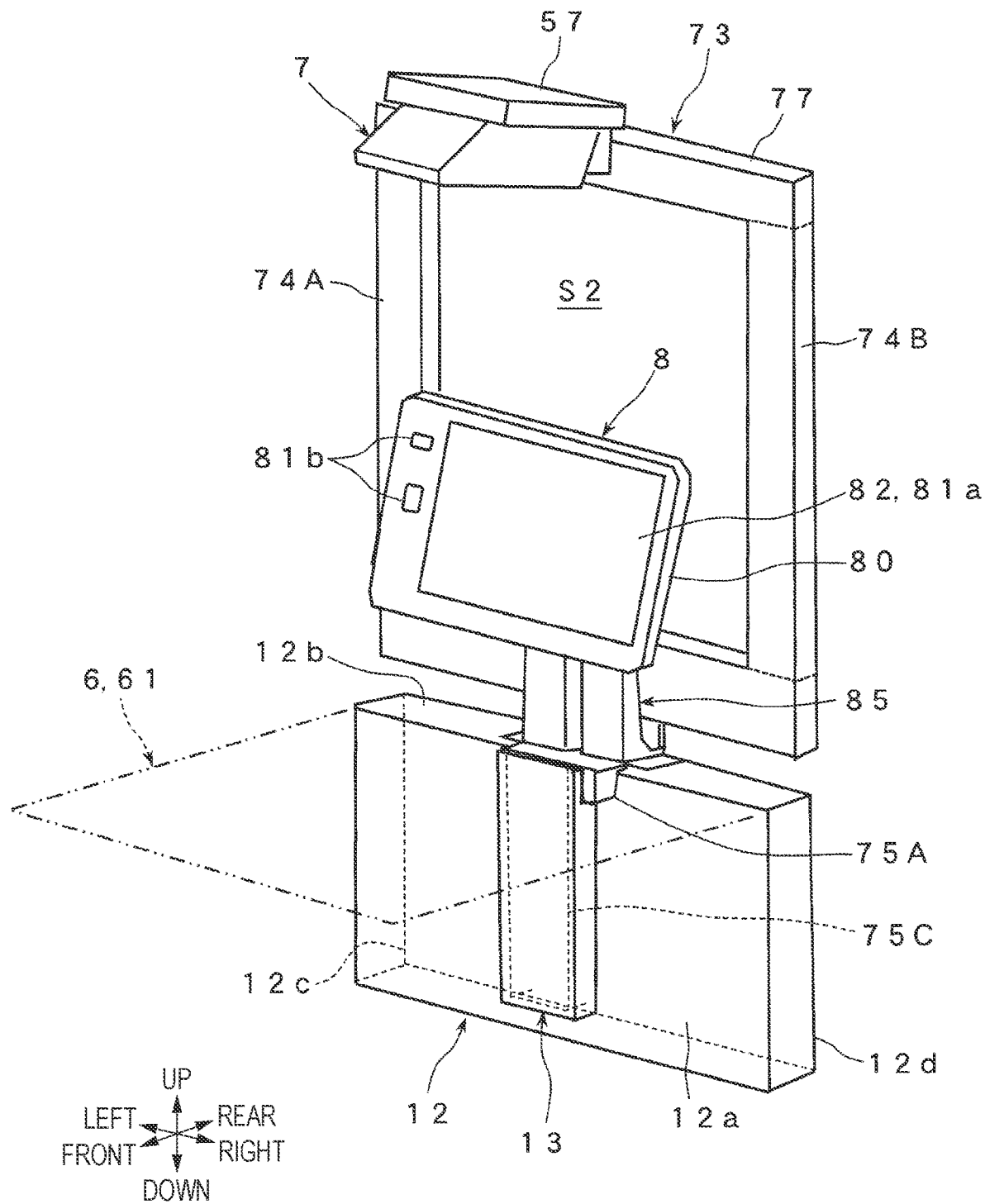
FIG. 13 is a perspective view schematically illustrating an area where an outer cover has been removed from the reading device in FIG. 12.

As illustrated in FIGS. 12 and 13, in the reading device 5, the entire first attachment frame 73 to which the operation unit 8 is attached and a part of the second attachment frame 85 to which the operation unit 8 is attached are covered with the frame cover 15 serving as an example of an outer cover. Furthermore, the reader 7 is covered with the device cover 17 serving as an example of an outer cover.

Moreover, in the reading device 5, the first attachment frame 73 and the second attachment frame 85 are attached to the rear frame 12 of the body 51.

In this case, the body 51 having the base 6, the reader 7, the operation unit 8, the rear frame 12, the first attachment frame 73, the second attachment frame 85, the frame cover 15, and the device cover 17 are substantially identical to the body 51 having the base 6, the reader 7, the operation unit 8, the rear frame 12, the first attachment frame 73, the second attachment frame 85, the frame cover 15, and the device cover 17 in the reading unit 50 of the image forming apparatus 1 according to the first exemplary embodiment except for some configurations, such as different dimensions.

In particular, the body 51 and the rear frame 12 have smaller height dimensions.

Similar to the reading unit 50 according to the first exemplary embodiment, the reading device 5 has a function for using information read by the reader 7 as display information to be displayed on the display of the operation unit 8.

When the reading device 5 is to perform a reading process on the read target object 90 placed on the base 6, a user uses the operation unit 8 to operate the device, thereby starting the reading process.

In this case, when the user operates the operation unit 8 to start the reading process, the reader 7 operates to read the read target object 90 placed on the base 6.

However, when this reading process starts, the operation unit 8 is vibrated due to the user touching and manually operating the operation unit 8. Therefore, in the reading device 5, the vibration may be transmitted from the second attachment frame 85, to which the operation unit 8 is attached, toward the first attachment frame 73, to which the reader 7 is attached, via the rear frame 12, and may ultimately be transmitted to the reader 7, possibly causing the reader 7 to shake.

In the reading device 5, a frame having the two frame portions 74A and 74B extending upward at positions located away from each other is used as the first attachment frame 73 to which the reader 7 is attached, as illustrated in FIG. 13.

Therefore, in a case where the read target object 90 is to be placed on the base 6 and is to be read by the reader 7 in the reading device 5, the shaking of the reader 7 occurring when the operation unit 8 is touched for operating the device may be suppressed, as compared with the reading device 5X according to the comparative example in which the reader 7 is attached to the single first attachment frame 730 illustrated in FIG. 18.

Furthermore, in the reading device 5, other effects achieved in the image forming apparatus 1 and the reading unit 50 according to the first exemplary embodiment described above are similarly achieved.

Modifications

Although exemplary embodiments of the present disclosure have been described above, the exemplary embodiments of the present disclosure are not limited to the first and second exemplary embodiments described above and permits various modifications and implementations so long as they do not depart from the scope of the exemplary embodiments of the present disclosure. Therefore, the exemplary embodiments of the present disclosure include, for example, the following modifications.

The first attachment frame 73 to which the reader 7 is attached may be one of first attachment frames 73B and 73C schematically illustrated in FIGS. 14A and 14B.

An image forming apparatus 1B or a reading device 5B (first modification) illustrated in FIG. 14A uses the first attachment frame 73B in which (the lowermost areas of) the two frame portions 74A and 74B are directly attached to the rear frame 12. In other words, the first attachment frame 73B is obtained by omitting the upright base portion 75 and the branch portion 76 from the first attachment frame 73 according to the first exemplary embodiment.

The first attachment frame 73B is attached such that the frame portions 74A and 74B are located at the opposite ends of the rear frame 12 in the left-right direction. In the case of the first attachment frame 73B, the distance D between the frame portions 74A and 74B is increased, so that shaking of the reader 7 when the operation unit 8 is touched for operating the device or the apparatus may be readily suppressed, as compared with, for example, a case of the first attachment frame 73C to be described next.

An image forming apparatus 1C or a reading device 5C (second modification) illustrated in FIG. 14B uses the first attachment frame 73C to which (the lowermost areas of) the two frame portions 74A and 74B are directly attached to the rear frame 12. The first attachment frame 73C is attached such that the frame portions 74A and 74B are located outward of the left and right ends 8a and 8b of the operation unit 8 in the left-right direction and close to the ends 8a and 8b.

If the first attachment frame 73C according to the second modification is used, the shaking of the reader 7 when the operation unit 8 is touched for operating the device or the apparatus may be readily suppressed, as compared with a case where a second attachment frame 89 according to a fourth modification (FIG. 16) to be described later is used.

Figure 15:
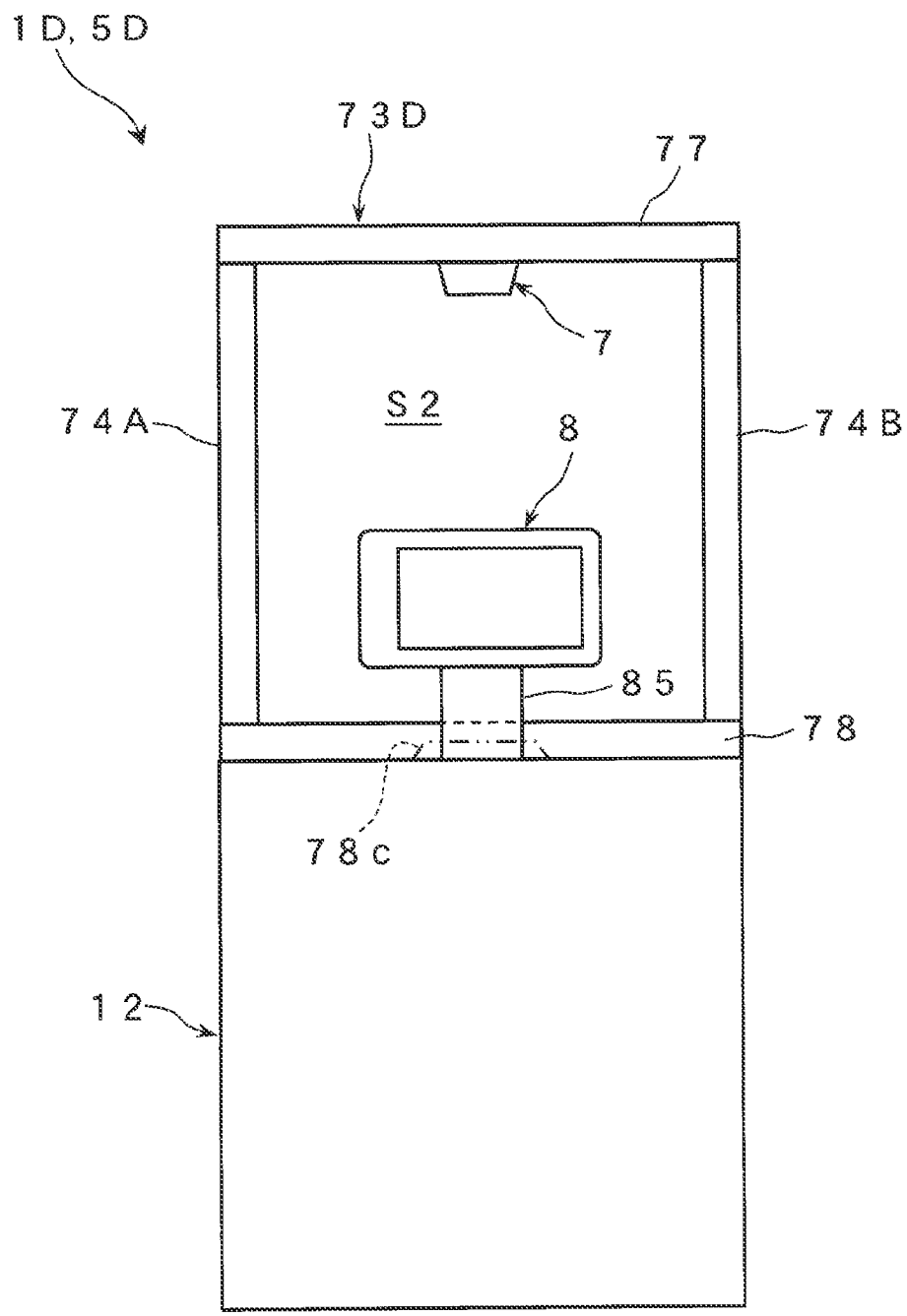
FIG. 15 is a front view schematically illustrating the first attachment frame according to a third modification.

Furthermore, the first attachment frame 73 used may be a first attachment frame 73D schematically illustrated in FIG. 15.

An image forming apparatus 1D or a reading device 5D (third modification) illustrated in FIG. 15 includes a base portion 78 attached to the upper end (e.g., the upper end surface 12b) of the rear frame 12 and extending in the left-right direction, and uses the first attachment frame 73D in which the frame portions 74A and 74B extend upward from the base portion 78.

In the first attachment frame 73D, the frame portions 74A and 74B extend upward from the opposite ends of the base portion 78 in the left-right direction. Alternatively, the frame portions 74A and 74B may be provided at positions located inward of the opposite ends of the base portion 78 in the left-right direction. As illustrated in FIG. 15, the base portion 78 may be provided with a contact-avoidance recess 78c having a predetermined shape and a predetermined size for avoiding contact with a lower area of the second attachment frame 85 attached to the rear frame 12.

In the case where the first attachment frame 73D according to the third modification is used, the base portion 78 is interposed between each of the frame portions 74A and 74B and the rear frame 12. Consequently, when the operation unit 8 is touched for operating the device or the apparatus, transmission of a vibration from the second attachment frame 85 to the first attachment frame 73D via the rear frame 12 may be suppressed, as compared with the case where (the lower areas of) the frame portions 74A and 74B of the first attachment frame 73 are directly attached to the rear frame 12.

Figure 16:
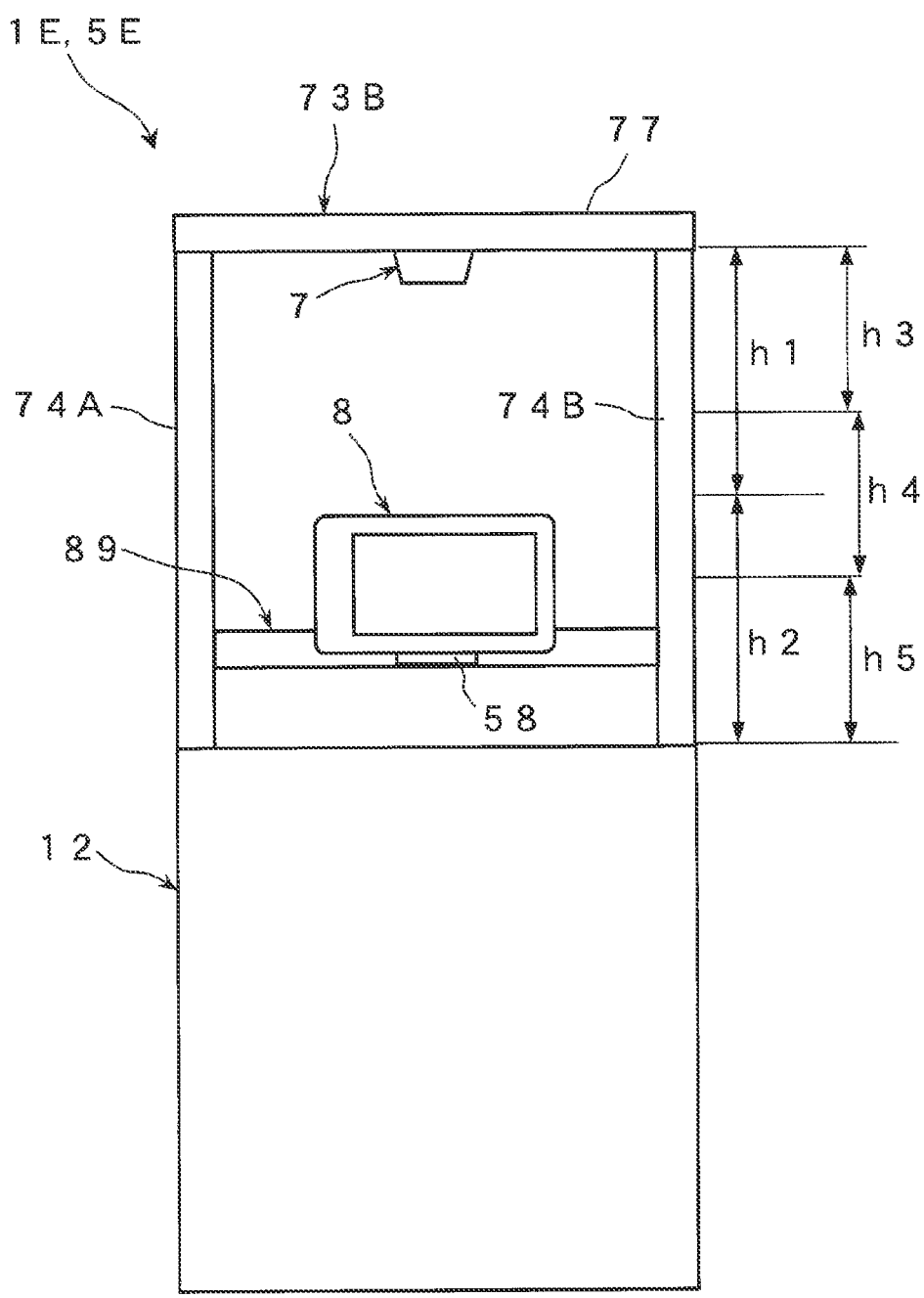
FIG. 16 is a front view schematically illustrating the first attachment frame and the second attachment frame according to a fourth modification.

Furthermore, the second attachment frame 85 used may be changed to the second attachment frame 89 schematically illustrated in FIG. 16.

An image forming apparatus 1E or a reading device 5E (fourth modification) illustrated in FIG. 16 uses the second attachment frame 89 that is attached so as to connect the two frame portions 74A and 74B of the first attachment frame 73 to each other. In the fourth modification, the first attachment frame used is the first attachment frame 73B according to the first modification (FIG. 14A), but is not limited thereto. For example, the first attachment frame 73D according to the third modification may be used.

The second attachment frame 89 according to the fourth modification is a frame formed of an angular pipe extending linearly in the left-right direction and attached so as to connect the two frame portions 74A and 74B to each other. In this case, the operation unit 8 is attached to the second attachment frame 89 with the bracket 58 interposed therebetween.

Furthermore, as illustrated in FIG. 16, the second attachment frame 89 is connected at a height position h2 that is located within a lower half range when the height dimension of the frame portions 74A and 74B is divided into two equal parts. However, from the standpoint of suppressing a vibration occurring when the operation unit 8 is touched for operating the device or the apparatus and suppressing the transmission of the vibration, the second attachment frame 89 may be connected at a height position h5 that is within a lowermost range when the height dimension of the frame portions 74A and 74B is divided into three equal parts.

In the case where the second attachment frame 89 according to the fourth modification is used, shaking of the reader 7 occurring when the operation unit 8 is touched for operating the device or the apparatus may be suppressed, as compared with a case where the second attachment frame to which the operation unit 8 is attached is attached to a single frame portion 74A (or 74B) of the first attachment frame 73B.

Figure 19:
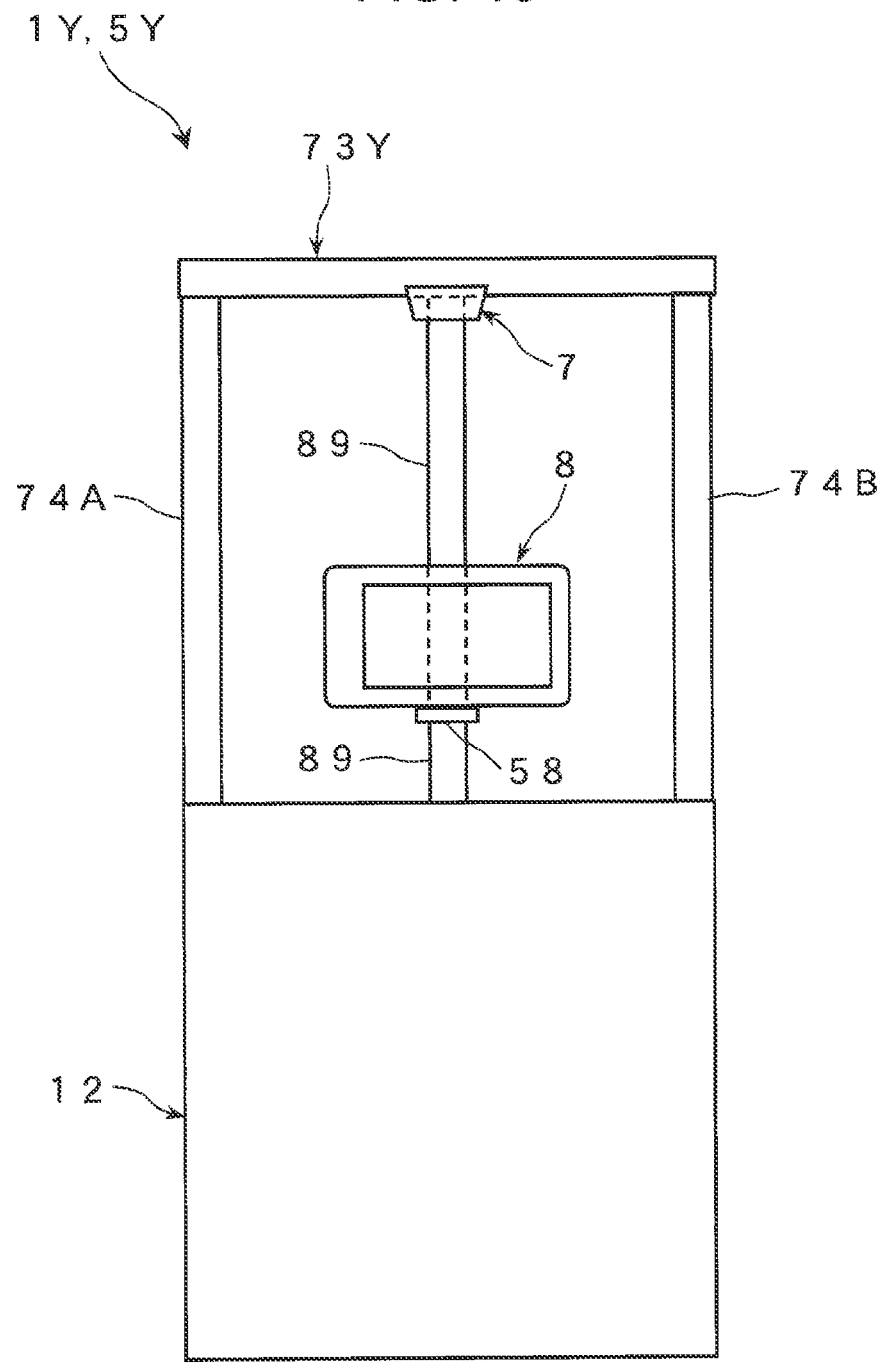
FIG. 19 is a front view schematically illustrating an image forming apparatus or a reading device equipped with a second attachment frame according to an inappropriate reference configuration example.

On the other hand, as the second attachment frame to which the operation unit 8 is attached, it is not appropriate to use a second attachment frame 89 that connects the upper-end connection portion 77 of a first attachment frame 73Y and the upper end of the rear frame 12 to each other, as illustrated in FIG. 19. In this case, the operation unit 8 is attached to a predetermined position of the second attachment frame 89.

In the case where such a second attachment frame 89 is used, a vibration occurring when the operation unit 8 is touched for operating the device or the apparatus is also distributed to, for example, the two frame portions 74A and 74B. However, the vibration is transmitted via the second attachment frame 89 that is connected to the reader 7 by the shortest path, thus making it difficult to suppress the shaking of the reader 7 occurring when the operation unit 8 is touched for operating the device or the apparatus. Although the second attachment frame 89 may be provided such that the lower end thereof is connected to the base portion 78 (see FIG. 15) according to the third modification, it is similarly difficult in this case to suppress the shaking of the reader 7.

Furthermore, the first attachment frame 73 used may be one of first attachment frames 73F and 73G schematically illustrated in FIGS. 17A and 17B.

An image forming apparatus 1F or a reading device 5F (fifth modification) illustrated in FIG. 17A uses the first attachment frame 73F having two inclined frame portions 74C and 74D, extending diagonally upward slightly at an angle toward the center in the left-right direction, as multiple frame portions extending upward at positions located away from each other.

The first attachment frame 73F uses the inclined frame portions 74C and 74D in place of the two frame portions 74A and 74B based on the first attachment frame 73B (FIG. 14A) according to the first modification. For example, the inclined frame portions 74C and 74D may be provided with, for example, the branch portion 76 of the first attachment frame 73 according to the first exemplary embodiment or the base portion 78 of the first attachment frame 73D according to the third modification. The inclined frame portions 74C and 74D are not limited to linearly-extending frames and may alternatively be bent frames.

An image forming apparatus 1G or a reading device 5G (sixth modification) illustrated in FIG. 17B uses the first attachment frame 73G having two inclined frame portions 74E and 74F, extending linearly upward substantially vertically and subsequently bending toward the center in the left-right direction, as multiple frame portions extending upward at positions located away from each other.

The first attachment frame 73G may be regarded as, for example, a frame obtained by omitting the upper-end connection portion 77 from the first attachment frame 73B according to the first modification or by changing the upper-end connection portion 77 into an upper-end connection portion that bends in a circular-arc shape.

The two inclined frame portions 74E and 74F illustrated in FIG. 17B are coupled to each other at the upper ends thereof, but may alternatively be obtained by being integrally molded. Furthermore, instead of having the portions that extend linearly upward substantially vertically, the two inclined frame portions 74E and 74F may entirely be frame portions that bend in a circular-arc shape (e.g., a semi-circular-arc shape).

The first attachment frame 73 or 73B according to the first exemplary embodiment or each modification to which the reader 7 is attached may be an integrally-molded frame instead of being a frame obtained by combining multiple components constituting the first attachment frame with each other by using a fixing technique, such as screwing or welding.

The first attachment frame 73 having the upper-end connection portion 77 may be provided with one or more intermediate connection portions that connect areas (such as intermediate areas), which are located below the upper-end connection portion 77 between the frame portions 74A and 74B, to each other.

In each of the first attachment frames 73, 73B, 73C, 73D, and 73F according to the first exemplary embodiment and the first, second, third, and fifth modifications, the multiple frame portions extending upward at positions located away from each other are the two frame portions 74A and 74B (or 74C and 74D, or 74E and 74F). Alternatively, the multiple frame portions extending upward at positions located away from each other may be three or more frame portions 74. Even in the case of the first attachment frame 73 having three or more frame portions 74, at least the lower area of any one of the frame portions 74 may be disposed outward of the second attachment frame 85 in the left-right direction.

The second attachment frame 85 to which the operation unit 8 is attached may be a frame having multiple pillar frame portions attached to the rear frame 12 so as to extend upward at positions located away from each other.

The rear frame 12 serving as an example of a body frame to which the first attachment frame 73 is attached or to which the first attachment frame 73 and the second attachment frame 85 are attached is not limited to that having the shape described in the first exemplary embodiment and may alternatively be a frame of another type.

In the reading unit 50 of the image forming apparatus 1 and the reading device 5 according to the exemplary embodiments and the modifications, the frame cover 15 and the device cover 17 may be omitted therefrom.

Furthermore, the image forming apparatus 1 is not limited to an image forming apparatus of a type that forms a monochrome image as described in the first exemplary embodiment, and may alternatively be an image forming apparatus of a type that forms a multicolor image.

Moreover, the image forming apparatus 1 may be an image forming apparatus that employs an image forming method other than the electrophotographic method. Examples of an image forming method other than the electrophotographic method include a liquid-droplet jet method, a photosensitive method, and a printing method.

The operation unit 8 is characterized in that a vibration occurring when the operation unit 8 is operated by being touched may induce the aforementioned problems related to the reading process of the reader 7 by being transmitted to the first attachment frame 73 of the reader 7. Therefore, the operation unit 8 also conceptually includes a third unit, such as a fingerprint authentication unit or an authentication card reader.

However, as compared with an operation unit including the aforementioned touchscreen or a physical button, such a third unit is less likely to vibrate since it is less likely to be manually operated by being touched, and is also characterized in that there is some time before the reader 7 starts the reading process after the third unit is operated.

Therefore, if the aforementioned third unit is disposed near the reader 7, the configuration related to the first attachment frame 73 and the second attachment frame 85 as in the above exemplary embodiments and the modifications of the present disclosure may or may not be employed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A reading device comprising:
a body having a base on which a read target object is placed;
a reader that reads the read target object placed on the base;
a first attachment frame to which the reader is attached such that the reader is disposed above the base;
an operation unit that is used for operating the device by touching;
a second attachment frame to which the operation unit is attached such that the operation unit is disposed above the base and below the reader; and
a body frame to which at least the first attachment frame is attached,
wherein the first attachment frame includes a plurality of frame portions extending upward at positions located away from each other.

(((2)))
The reading device according to (((1))), wherein the second attachment frame is attached to the body frame without being in contact with the first attachment frame.

(((3)))
The reading device according to (((1))) or (((2))), wherein the plurality of frame portions are disposed such that at least lower areas thereof are located outward of the second attachment frame in a left-right direction.

(((4)))
The reading device according to (((1))) or (((2))), wherein the plurality of frame portions are disposed such that at least lower areas thereof are located outward of left and right ends of the operation unit in a left-right direction.

(((5)))
The reading device according to any one of (((1))) to (((4))), wherein the first attachment frame includes an upper-end connection portion that extends laterally and that connects upper ends of the plurality of frame portions to each other.

(((6)))
The reading device according to any one of (((1))) to (((5))),
wherein the first attachment frame includes an upright base portion attached to the body frame and standing upright above the base, and a branch portion that branches off laterally from an upper end of the upright base portion, and
wherein the plurality of frame portions each extend upward from the branch portion.

(((7)))
The reading device according to any one of (((1))) to (((5))),
wherein the first attachment frame includes a base portion that is attached to an upper end of the body frame and that extends laterally, and
wherein the plurality of frame portions each extend upward from the base portion.

(((8)))
The reading device according to (((1))), wherein the second attachment frame is attached so as to connect at least two frame portions of the plurality of frame portions to each other.

(((9)))
The reading device according to (((8))), wherein the second attachment frame is connected at a height position located within a lower half range of the at least two frame portions.

(((10)))
An image forming apparatus comprising:
a reading unit that reads a read target object placed on a base from above the base; and
an image forming unit capable of forming an image corresponding to information read by the reading unit onto a recording medium,
wherein the reading unit includes the reading device according to any one of (((1))) to (((9))).

What is claimed is:
1. A reading device comprising:
a body having a base on which a read target object is placed;
a reader that reads the read target object placed on the base;
a first attachment frame to which the reader is attached such that the reader is disposed above the base;
an operation unit that is used for operating the device by touching;

a second attachment frame to which the operation unit is attached such that the operation unit is disposed above the base and below the reader; and
a body frame to which at least the first attachment frame is attached, wherein
the first attachment frame includes a plurality of frame portions extending upward at positions located away from each other, and
the second attachment frame is attached to the body frame without being in contact with the first attachment frame.

2. The reading device according to claim 1,
wherein the plurality of frame portions are disposed such that at least lower areas thereof are located outward of the second attachment frame in a left-right direction.

3. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 2.

4. The reading device according to claim 1,
wherein the plurality of frame portions are disposed such that at least lower areas thereof are located outward of left and right ends of the operation unit in a left-right direction.

5. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 4.

6. The reading device according to claim 1,
wherein the first attachment frame includes an upper-end connection portion that extends laterally and that connects upper ends of the plurality of frame portions to each other.

7. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 6.

8. The reading device according to claim 1,
wherein the first attachment frame includes an upright base portion attached to the body frame and standing upright above the base, and a branch portion that branches off laterally from an upper end of the upright base portion, and
wherein the plurality of frame portions each extend upward from the branch portion.

9. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 8.

10. The reading device according to claim 1,
wherein the first attachment frame includes a base portion that is attached to an upper end of the body frame and that extends laterally, and
wherein the plurality of frame portions each extend upward from the base portion.

11. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 10.

12. The reading device according to claim 1,
wherein the second attachment frame is attached so as to connect at least two frame portions of the plurality of frame portions to each other.

13. The reading device according to claim 12,
wherein the second attachment frame is connected at a height position located within a lower half range of the at least two frame portions.

14. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 13.

15. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 12.

16. An image forming apparatus comprising:
a reading unit that reads a read target object placed on a base from above the base; and
an image forming unit capable of forming an image corresponding to information read by the reading unit onto a recording medium,
wherein the reading unit includes the reading device according to claim 1.

17. A reading device comprising:
a body having a base on which a read target object is placed;
reading means for reading the read target object placed on the base;
a first attachment frame to which the reading means is attached such that the reading means is disposed above the base;
operation means for operating the device by touching;
a second attachment frame to which the operation means is attached such that the operation means is disposed above the base and below the reading means; and
a body frame to which at least the first attachment frame is attached, wherein
the first attachment frame includes a plurality of frame portions extending upward at positions located away from each other, and
the second attachment frame is attached to the body frame without being in contact with the first attachment frame.

* * * * *